(12) United States Patent
Aoki et al.

(10) Patent No.: US 8,463,600 B2
(45) Date of Patent: Jun. 11, 2013

(54) SYSTEM AND METHOD FOR ADJUSTING FLOOR CONTROLS BASED ON CONVERSATIONAL CHARACTERISTICS OF PARTICIPANTS

(75) Inventors: Paul Masami Aoki, Berkeley, CA (US); Margaret H. Szymanski, Santa Clara, CA (US); James D. Thornton, Redwood City, CA (US); Daniel H. Wilson, Pittsburgh, PA (US); Allison Gyle Woodruff, Berkeley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/406,365

(22) Filed: Feb. 27, 2012

(65) Prior Publication Data
US 2012/0158402 A1 Jun. 21, 2012

Related U.S. Application Data

(63) Continuation of application No. 12/615,239, filed on Nov. 9, 2009, now Pat. No. 8,126,705, which is a continuation of application No. 10/414,912, filed on Apr. 16, 2003, now Pat. No. 7,617,094.

(60) Provisional application No. 60/450,724, filed on Feb. 28, 2003.

(51) Int. Cl.
*G10L 19/00* (2006.01)
*G10L 11/04* (2006.01)
*G10L 11/06* (2006.01)
*H04Q 11/00* (2006.01)

(52) U.S. Cl.
USPC ........... 704/206; 704/201; 704/207; 704/208; 704/210; 704/214; 704/215; 704/235; 370/260; 370/263

(58) Field of Classification Search
USPC .................. 704/201, 235, 255, 275; 379/52, 379/202.01; 370/260, 263, 338, 353; 455/518
See application file for complete search history.

(56) References Cited

U.S. PATENT DOCUMENTS 3,944,736 A 3/1976 Shepard
4,317,961 A 3/1982 Johnson
(Continued)

FOREIGN PATENT DOCUMENTS

JP 03-029555 2/1991
JP 04-082357 3/1992
(Continued)

OTHER PUBLICATIONS

Hans-Peter Dommel, J.J. Garcia-Luna-Aceves. Floor control for multimedia conferencing and collaboration. Baskin Center for Computer Engineering & Information Sciences, University of California, Santa Cruz, CA 95064, USA. Multimedia Systems (1997) 5: 23-38.*

(Continued)

*Primary Examiner* — Pierre-Louis Desir
*Assistant Examiner* — Matthew Baker
(74) *Attorney, Agent, or Firm* — Patrick J. S. Inouye; Krista A. Wittman

(57) ABSTRACT

A system and method for automatically adjusting floor controls based on conversational characteristics is provided. Audio streams are received, which each originate from an audio source. Floor controls for a current configuration including at least a portion of the audio streams are maintained. Conversational characteristics shared by two or more of the audio sources are determined. Possible configurations for the audio streams are identified based on the conversational characteristics. An analysis of the current configuration and the possible configurations is performed. A change threshold comprising a minimum number of timeslices for at least one of the current configuration and one of the possible configurations is applied to the analysis. When the analysis satisfies the change threshold, the floor controls are automatically adjusted. The audio streams are mixed into one or more outputs based on the adjusted floor controls.

20 Claims, 15 Drawing Sheets

U.S. PATENT DOCUMENTS

| | | | |
|---|---|---|---|
| 4,531,024 A | | 7/1985 | Colton et al. |
| 4,734,934 A | | 3/1988 | Boggs et al. |
| 5,473,605 A | | 12/1995 | Grube et al. |
| 5,483,588 A | | 1/1996 | Eaton et al. |
| 5,495,522 A | | 2/1996 | Allen et al. |
| 5,533,112 A | | 7/1996 | Danneels |
| 5,548,638 A | | 8/1996 | Yamaguchi et al. |
| 5,557,725 A | | 9/1996 | Ansberry et al. |
| 5,561,737 A | | 10/1996 | Bowen |
| 5,566,238 A | | 10/1996 | Wagner et al. |
| 5,668,863 A | | 9/1997 | Bieselin et al. |
| 5,761,637 A | | 6/1998 | Chino |
| 5,768,263 A | | 6/1998 | Tischler et al. |
| 5,771,273 A | | 6/1998 | McAllister et al. |
| 5,818,514 A | | 10/1998 | Duttweiler et al. |
| 5,889,764 A | | 3/1999 | Needham et al. |
| 5,889,843 A | | 3/1999 | Singer et al. |
| 5,953,400 A | | 9/1999 | Rosenthal et al. |
| 5,991,277 A | | 11/1999 | Maeng et al. |
| 5,991,385 A | | 11/1999 | Dunn et al. |
| 5,999,965 A | * | 12/1999 | Kelly ........................... 709/202 |
| 6,125,115 A | | 9/2000 | Smits |
| 6,157,711 A | | 12/2000 | Katz |
| 6,178,237 B1 | | 1/2001 | Horn |
| 6,192,395 B1 | | 2/2001 | Lerner et al. |
| 6,236,854 B1 | | 5/2001 | Bradshaw, Jr. |
| 6,246,981 B1 | | 6/2001 | Papineni et al. |
| 6,304,648 B1 | | 10/2001 | Chang |
| 6,327,567 B1 | | 12/2001 | Willehadson et al. |
| 6,463,038 B1 | | 10/2002 | Wilson |
| 6,498,791 B2 | * | 12/2002 | Pickett et al. ................. 370/353 |
| 6,501,739 B1 | | 12/2002 | Cohen |
| 6,559,863 B1 | * | 5/2003 | Megiddo ....................... 715/753 |
| 6,608,644 B1 | | 8/2003 | Kondo et al. |
| 6,728,358 B2 | * | 4/2004 | Kwan ..................... 379/202.01 |
| 6,771,759 B2 | | 8/2004 | Mark et al. |
| 6,804,340 B2 | * | 10/2004 | Howard et al. .......... 379/202.01 |
| 6,816,468 B1 | | 11/2004 | Cruickshank |
| 6,826,159 B1 | | 11/2004 | Shaffer et al. |
| 6,850,496 B1 | * | 2/2005 | Knappe et al. ................ 370/260 |
| 6,914,964 B1 | * | 7/2005 | Levine ............................. 379/52 |
| 6,941,372 B2 | | 9/2005 | Pearson |
| 7,107,312 B2 | | 9/2006 | Hackbarth et al. |
| 7,149,298 B2 | * | 12/2006 | Fernandes et al. ....... 379/202.01 |
| 7,420,935 B2 | * | 9/2008 | Virolainen ..................... 370/263 |
| 7,480,259 B2 | * | 1/2009 | Covell et al. .................. 370/260 |
| 7,706,339 B2 | * | 4/2010 | Shaffer et al. ................. 370/338 |
| 7,831,270 B2 | * | 11/2010 | Kalley et al. .................. 455/518 |
| 7,860,070 B2 | * | 12/2010 | Shaffer et al. ................. 370/338 |
| 7,876,714 B2 | * | 1/2011 | Ethier et al. ................... 370/260 |
| 2001/0021909 A1 | | 9/2001 | Shimomura et al. |
| 2002/0065928 A1 | | 5/2002 | Senga et al. |
| 2002/0172339 A1 | | 11/2002 | Creswell et al. |
| 2004/0107108 A1 | | 6/2004 | Rohwer |
| 2005/0031110 A1 | * | 2/2005 | Haimovich et al. ...... 379/202.01 |
| 2005/0273334 A1 | | 12/2005 | Schleifer et al. |
| 2010/0057445 A1 | * | 3/2010 | Aoki et al. .................... 704/201 |

FOREIGN PATENT DOCUMENTS

| | | |
|---|---|---|
| JP | 07-049695 | 2/1995 |
| JP | 09-107534 | 4/1997 |
| JP | 10-145763 | 5/1998 |
| JP | 11-259501 | 9/1999 |
| JP | 2000-352996 | 12/2000 |

OTHER PUBLICATIONS

Ackerman, Mark S. et al., "Hanging on the Wire: A Field Study of an Audio-Only Media Space," ACM Transactions on Computer-Human Interaction, vol. 4, No. 1, Mar. 1997, pp. 39-66.

Addeo, E. J. et al., "An Experimental Multi-Media Bridging System," Bell Communications Research, 1988, pp. 236-242.

Arons, Barry, "A Review of the Cocktail Party Effect," Journal of the American Voice I/O Society, vol. 12, 1992, pp. 35-50.

Berc, Lance et al., "Pssst: Side Conversations in the Argo Telecollaboration System," Proceedings of UIST '95, Pittsburgh, PA, Nov. 14-17, 1995, pp. 155-156.

Bly, Sara A. et al., "Media Spaces: Bringing People Together in a Video, Audio, and Computing Environment," Communications of the ACM, vol. 36, No. 1, Jan. 1998, pp. 27-47.

Brady, Paul T., "Effects of Transmission Delay on Conversational Behavior on Echo-Free Telephone Circuits," Bell Systems Technical Journal, vol. 50, Jan. 1971, pp. 115-134.

Cohen. Michael et al., "Multidimensional Audio Window Management," International Journal of Man-Machine Studies, vol. 34, No. 3, Mar. 1991, pp. 319-336.

Corner, Mark D. et al., "Zero-Interaction Authentication," Conference on Mobile Computing and Networking (MobiCom '02), Sep. 23-28, 2002.

Dourish, Paul et al., "Awareness and Coordination in Shared Workspaces," In Proceedings of ACM CSCW '92 Conference on Computer Supported Cooperative Work, Toronto, Canada. Nov. 1992. pp. 107-114.

Edelsky, Carole, "Who's Got the Floor?" Language in Society, vol. 10, 1981. pp. 383-421.

Egbert, Maria M. "Schisming: The Collaborative Transformation From a Single Conversation to Multiple Conversations," Research on Language & Social Interaction, vol. 30, No. 1, 1997, pp. 1-51.

Kleiter, Gernot D., "The Posterior Probability of Bayes Nets with Strong Dependences," Soft Computing, vol. 3, 1999, pp. 162-173.

Lee, Kwan Hong, "Impromptu: Audio Applications for Mobile IP," Thesis submitted to Massachusetts Institute of Technology, Sep. 2001.

Meteer, Marie et al., "Application Development: Just the Facts," Speech Technology Magazine, Jun./Jul. 1998, printed from http://www.speechtechmag.com/pub/3 3/cover/445-1.html.

Morgan, Nelson et al., "The Meeting Project at ICSI," Proceedings of HLT 2001, First International Conference on Human Language Technology Research, J. Allan, ed., Morgan Kaufmann, San Francisco, 2001, pp. 246-252.

Patterson, Emily S. et al., "Voice Loops as Coordination Aids in Space Shuttle Mission Control," Computer Supported Cooperative Work, vol. 8, 1999, pp. 353-371.

Rohlicek, J. r. et al., "Gisting Conversational Speech," Proceedings of the 1992 IEEE International Conference on Acoustics, Speech and Signal Processing, vol. 2, 1992, pp. 113-116.

Sacks, Harvey, "Notes on Methodology," Atkinson, J. and Heritage, John (eds.): Structure of Social Action: Studies in Conversation Analysis. Cambridge University Press,1984, pp. 21-27.

Sacks, Harvey et al., "A Simplest Systematics for the Organization of Turn-Taking for Conversation," Language, vol. 50, 1974, pp. 696-735.

Sawhney, Nitin et al., "Nomadic Radio: Speech and Audio Interaction for Contextual Messaging in Nomadic Environments," ACM Transactions on Computer-Human Interaction, vol. 7, No. 3, Sep. 2000, pp. 353-383.

Schegloff, Emanuel A. et al., "The Preference for Self-Correction in the Organization of Repair in Conversation", Language, vol. 53, 1977, pp. 361-382.

Sellen, Abigail J., "Remote Conversations: The Effects of Mediating Talk with Technology," Human-Computer Interaction, vol. 10, 1995, pp. 401-444.

Shell, Jeffrey S. et al., Interacting With Groups of Computers, Communications of the ACM, vol. 46, No. 3, Mar. 2003, pp. 40-46.

Skaburskis, Alexander W. et al., "AuraMirror: Artistically Visualizing Attention," CHI 2003, Apr. 5-10, 2003, Ft. Luderdale, Florida.

Smith, Ian et al., "Low Distrubance Audio for Awareness and Privacy in Media Space Applications," Proceedings of ACM Conference on Multimedia, Nov. 1995, San Francisco, CA: ACM.

Stiefelhagen, Rainer et al., "Estimating Focus of Attention Based on Gaze and Sound," In IEEE PUI, Orlando, FL, 2001.

Stiefelhagen, Rainer et al., "Modeling Focus of Attention for Meeting Indexing Based on Multiple Cues," IEEE Transactions on Neural Networks, vol. 13, No. 4, Jul. 2002, pp. 928-938.

Stiefelhagen, Rainer, "Tracking and Modeling Focus of Attention in Meetings," Dissertation, University of Karlsruhe, Jul. 5, 2002.

Stiefelhagen, Rainer, "Tracking Focus of Attention in Meetings," Proceedings of the Fourth IEEE International Conference on Multimodal Interfaces (ICMI '02), Pittsburgh, PA, 2002.

Strub, Henry B., "Concert Talk: A Weekend with a Portable Audio Space," In Proceedings of the 6th, IFIP Conference on Human-Computer Interaction (INTERACT'97). Chapman and Hall, London, U.K.

Thomason, W. Ray et al., "Pauses, Transition Relevance, and Speaker Change," Human Communication Research, vol. 18, No. 3, Mar. 1992, pp. 429-44.

Traum, David et al., "Embodied Agents for Multi-party Dialogue in Immersive Virtual Worlds," AAMAS '02, 1st Joint Conference Autonomous Agents & Multi-Agent Systems, vol. 2, 2002, pp. 766-773.

Vertegaal, Roel et al., "GAZE-2: Conveying Eye contact in Group Video Conferencing Using Eye-Controlled Camera Direction," CHI 2003, Apr. 5-10, 2003, Ft. Lauderdale, Florida, 2003.

Whittaker, Steve et al., "Informal Workplace Comunication: What Is It Like and How Might We Support It?" Human Factors in Computing Systems, Boston, Massachusetts, Apr. 24-28, 1994, pp. 131-137.

Wilcox, Lynn D. et al., "Training and Search Algorithms for an Interactive Wordspotting System," Proceedings of the International Conference on Acoustics, Speech and Signal Processing, Mar. 1992, pp. 97-100.

Wilpon, Jay G. et al., "Automatic Recognition of Keywords in Unconstrained Speech Using Hidden Markov Models," IEEE Transactions on Acoustics, Speech and Signal Processing, vol. 38, No. 11, Nov. 1990, pp. 1870-1878.

Wilson, Thomas P. et al., "The Structure of Silence Between Turns in Two-Party Conversation," Discourse Processes, vol. 9, 1986, pp. 375-390.

Ye, Jinjin et al., "Phoneme Classification Using Naive Bayes Classifier in Reconstructed Phase Space," IEEE Digital Signal Processing Workshop 2002.

Basu, Sumit, "Conversational Scene Analysis," Thesis for the Degree of Doctor of Philosophy in Electrical Engineering and Computer Science at the Massachusetts Institute of Technology, Sep. 2002.

Bull, Matthew et al., "An Analysis of the Timing of Turn-taking in a Corpus of Goal-Oriented Dialogue," Proceedings of ICSLP '98: International Conference on Spoken Language Processing (ICSLP), vol. 4, Nov. 30-Dec. 4, 1998; pp. 1179-1182.

* cited by examiner

SYSTEM AND METHOD FOR ADJUSTING FLOOR CONTROLS BASED ON CONVERSATIONAL CHARACTERISTICS OF PARTICIPANTS

CROSS-REFERENCE TO RELATED APPLICATIONS

This patent application is a continuation application of U.S. Pat. No. 8,126,705, issued Feb. 28, 2012, which is a continuation application of U.S. Pat. No. 7,617,094, issued Nov. 10, 2009, which claims priority from U.S. Provisional Patent Application Ser. No. 60/450,724, filed Feb. 28, 2003, expired, the priority filing dates of which are claimed, and the disclosures of which are incorporated by reference.

INCORPORATION BY REFERENCE

This patent application is related to U.S. Pat. No. 7,698,141, issued Apr. 13, 2010, the disclosure of which is incorporated herein by reference.

FIELD

This invention relates to the field of computer-mediated group communication systems, and in particular, to a system and method for adjusting floor controls based on conversational characteristics of participants.

BACKGROUND

Groups of people have communicated together for eons. This communication includes styles where a group of people listen to a presenter as well as styles where people collaborate in a social interaction such as a meeting (among other styles). In the following description, the term meeting is intended to include all social interactions. Meetings often have subgroups of people who carry on separate conversations within the context of the meeting. Each of these subgroups maintains a conversational floor for that subgroup while the members of the subgroup maintain awareness of the primary group conversation. The primary group conversation generally continues even though separate conversational floors are established. While this conversational style works well when the number of participants is small and all of the participants are co-located (such as in a conference room), it is completely disruptive using existing technology that enables remote parties to communicate with each other (for example, teleconference technology, two-way shared radio channels, etc.).

An example of this problem is that of a "party line" telephone or teleconference call in which there is no capability to schism the conversation into separate conversational floors. This is also true of shared-channel radio systems such as police and fire-fighter radio communications. Communications between the participants are mixed together on the communication channel making it difficult for arbitrary users to communicate and often requiring complex protocols among the users to provide some order to the communications. Although some high-end teleconference systems support multiple conversational floors (for example, by "sub-conferencing" or by channel switching) the establishment and modification of these conversational floors is difficult. This difficulty lessens the spontaneity of establishing a conversational floor in a remote meeting.

Instant messaging and chat systems allow for schisming as a number of users can participate in a textual "chat room" where each user's typed message is displayed to all the members of the room (subject to per-member controls). Each user can also explicitly create and maintain a side-channel textual conversation with a subgroup of members. This schisming is not automatic but requires that explicit user commands be made to the system.

U.S. Pat. No. 6,327,567 B1 to Willehadson et al., entitled Method and System for Providing Spatialized Audio in Conference Calls, and filed Feb. 10, 1999 teaches a mechanism that allows sub-conferences (conversational floors). However, each user needs to manually enter a dialog with a command unit (by DTMF, by a user interface with a control unit or by a recognized voice command) to initiate or participate in a sub-conference or to switch between sub-conferences. In addition, Willehadson uses a complicated spatialization technique to indicate what sub-conferences are available. Willehadson does not teach automatic detection of conversational floors or automatic switching between conversational floors responsive to the conversational characteristics related to the conversations.

It would be advantageous to provide a capability that addresses the above-mentioned problems.

SUMMARY

One aspect of the invention is a method of identifying a conversation. This method includes the step of extracting streams of feature data from a conversation communication between users over a communicative interval. The streams of feature data are then analyzed in various combinations of users over a communicative interval to identify a conversation between two or more of the users. Other aspects of the invention include apparatus for implementing the method, and computer program products for causing a computer to, implement the method.

Another aspect of the invention is a method for an audio processing system that receives one or more audio streams where each audio stream is from one of a plurality of audio sources. A distinguishing step then distinguishes one or more audio substreams from the audio streams. A mixing step mixes the substreams (responsive to a plurality of floor controls) for one or more outputs that are associated with the audio sources. An analyzing step analyzes (for a plurality of users associated with the plurality of audio sources) one or more conversational characteristics of two or more of the plurality of users. Another step automatically adjusts the floor controls responsive to the step of analyzing. Other aspects of the invention include apparatus for implementing the method, and computer program products for causing a computer to implement the method.

A further aspect provides a system and method for automatically adjusting floor controls for a conversation is provided. Audio streams are received, which each originate from an audio source. Floor controls for a current configuration including at least a portion of the audio streams are maintained. Conversational characteristics shared by two or more of the audio sources are determined. Different possible configurations of interactions between participants of the audio streams are identified based on the conversational characteristics. A predetermined number of timeslices and is applied to each one of the possible configurations. When the threshold predetermined number of timeslices of one of the possible configurations is satisfied, the floor controls are automatically adjusted. The audio streams are mixed into one or more outputs based on the adjusted floor controls.

The foregoing and many other aspects of the present invention will no doubt become obvious to those of ordinary skill in the art after having read the following detailed description of the preferred embodiments that are illustrated in the various drawing figures.

BRIEF DESCRIPTION OF THE DRAWINGS

The embodiments of the invention will be described in detail, with reference to the following figures wherein.

DETAILED DESCRIPTION

Figure 1:
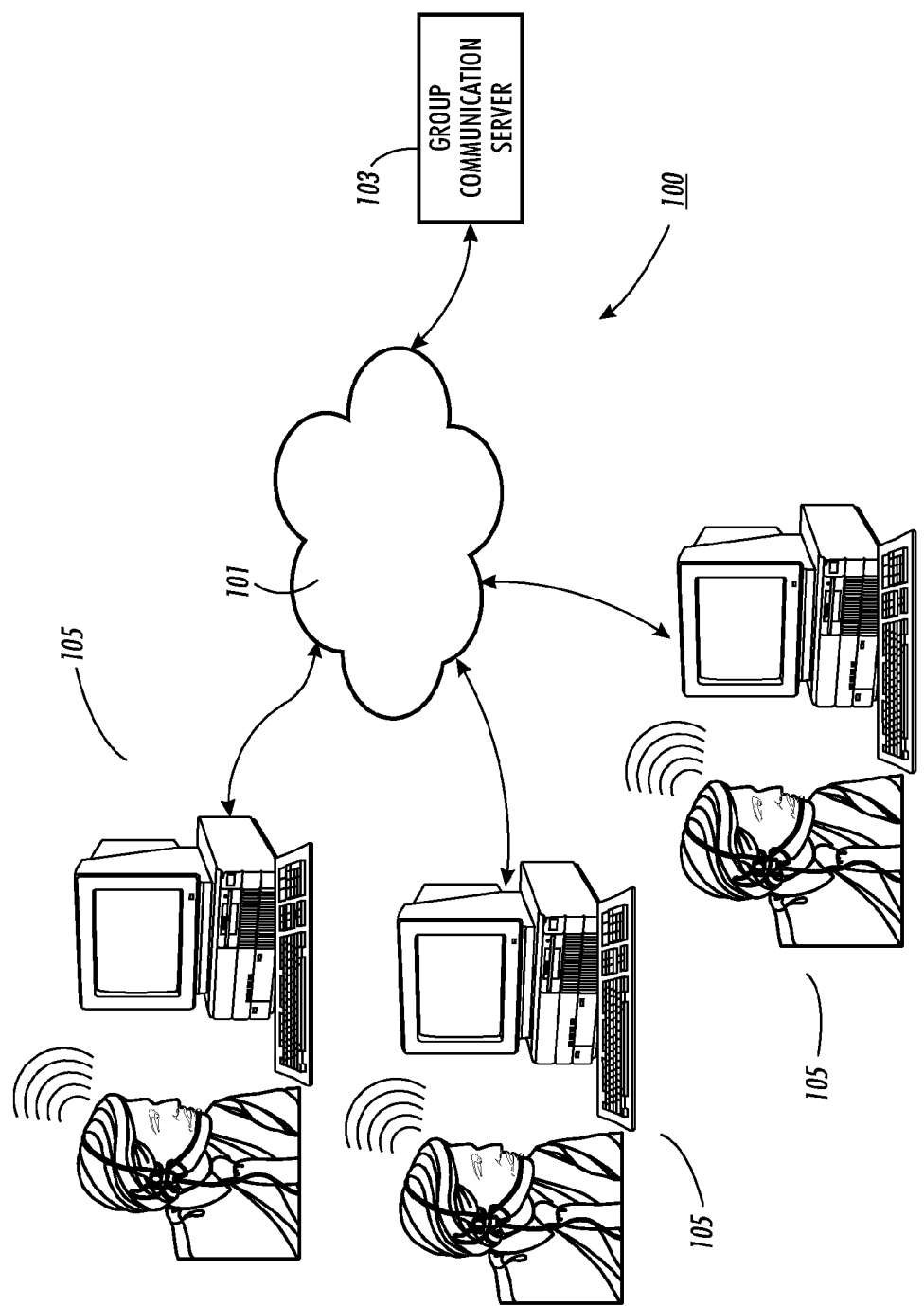
FIG. 1 illustrates an architecture in accordance with an embodiment.

One aspect of the invention is a media communication system employing automatic detection of human conversational behavior. In one embodiment, the system makes probabilistic inferences of conversational group membership based on conversational characteristics such as quantitative temporal relationships between specific audible cues and actions during conversation ("temporal features"). One embodiment of the system need not require an understanding of human speech as it uses the ability to detect the presence or absence of a given user's vocalizations and/or to detect specific vocalizations within the speech with a reasonable degree of reliability.

The conversational characteristics can include both audio characteristics and physiological characteristics (such as can be determined by a biometric device). Although much of the following explicitly describes the analysis of audio characteristics, one skilled in the art can, after reading the disclosure herein, apply equivalent techniques to any available physiological characteristics that can be received by the group communication server 103.

The detection of the presence/absence of a user's vocalizations can be done by capturing audio with a throat microphone or a "bone-conduction" microphone and then using a simple signal detection algorithm (e.g., one using energy thresholds and/or signal zero-crossing rates) to segment the audio into speech/silence. (A conventional microphone may be used to capture the user's speech for human listening purposes—the use of special microphones for speech detection is beneficial but not necessary because it decreases the amount of external noise for which the signal detection algorithm must allow.)

The temporal features can be classified using known pattern recognition techniques. One way to do this is to compare quantitative feature values to known distributions (e.g., the audio from a multiparty conversation can be segmented, hand-labeled and used to train a Naïve Bayes classifier). If a given relationship is known to be universal across users (or nearly so), a static distribution can be used. If a given relationship is subject to variation across users, an initial distribution can be incrementally modified. Some temporal features generally indicate membership in the same conversational floor. Speakers in the same conversational floor place the beginning of their vocalizations at transition relevance places (TRPs), temporally aligning them with pauses in other speakers' turns. This general principal can be used to develop a quantitative feature.

One example feature computes the time difference between the current start endpoint of speaker X's turn, t, and the previous final endpoint of speaker Y's most recent turn prior to t. This difference can be compared to a decreasing distribution (e.g., the comb-shaped distribution of Wilson & Zimmerman (Wilson, T. P. and Zimmerman, D. H., *The Structure of Silence Between Turns in Two-Party Conversation*, Discourse Processes 9 (1986), 375-390) or an empirical distribution) to produce an estimated probability that the speaker X and speaker Y are communicating.

Another example feature uses the characteristic that speakers do not simply wait for and react to the completion of other speakers' turns; rather, they project (i.e., anticipate) a turn's completion based on cues such as content and prosody. Since speaker X may misjudge when the previous speaker Y will finish a vocalization, the starting endpoint of X's turn sometimes starts before the final endpoint of Y's turn. This feature computes the time difference between the current start endpoint of speaker X's turn, t, and the final endpoint of speaker Y's turn that is closest to t (which may therefore be before or after t). This distribution can also be modeled empirically; again, longer differences are less likely to represent a deliberate alignment and thus, it is less likely that the speakers are in the same conversational floor.

Yet another example feature can look for evidence that the speakers are not in the same conversational floor. For example, while speakers do often overlap their speech (as when speakers start at the same time, or when speakers complete a sentence together), it is very unusual to see sustained periods of speech that overlaps with other speakers' speech if the speakers in question are in the same conversational floor. This general principal can be used to develop a quantitative feature.

One example algorithm is to determine a sliding time window T, and within T compute a vector corresponding to periods of simultaneous speech given some time quantization (for example, 1 millisecond). Then compute the scalar product of this vector with a weighting vector. The resulting value can be compared to an empirical distribution to determine a quantitative measurement for the feature.

Once the features are determined, they can then be used to compute likelihoods, posterior probabilities, and conversational floor configurations as is subsequently described.

Additional evidence of membership in a conversational floor can be obtained by recognizing particular vocalizations (for example, user or group names, or backchannel acknowledgement vocalizations). Details about these techniques are also subsequently described.

Physiological characteristics can also be compared with the user's audio to determine a feature.

One skilled in the art after reading the following will understand that a user can have a microphone or other audio pickup, and a speaker. The user's audio pickup generates signals that result in digitized packets that are identified as to their source (the source being, for example, the user). Digitized audio packets for output to the user are similarly identified, and these packets are generally sent back to the user for reproduction through the user's speakers or headphone. One aspect of the invention acquires audio from multiple sources, mixes the source's audio responsive to which user/source the mixed audio will be delivered, and automatically adjusts the mix responsive to an analysis of the conversational characteristics such as the vocalizations of the users. Such a one will also understand that streams of feature data can be extracted from the conversational communication between people. The conversational communication can be comprised of textual information, audible information, visual information, tactile information or some combination thereof. The conversational communication can be manually or automatically transcribed.

FIG. 1 illustrates an architecture 100 that includes a network 101, a group communication server 103 and a plurality of audible sources 105. The network 101 can be a LAN, WAN, the Internet, or any other network suitable for transporting audio information whether in digital or analog form. The plurality of audible sources 105 can include microphones that receive a person's vocalizations or vocalizations (and can also include a mechanism for detecting the occurrence of a person's vocalization to better separate vocalization from background noise—for example, a throat microphone). In addition, any of the plurality of audible sources 105 can be connected to the network 101 using wire or wireless technologies. Further, at least some of the plurality of audible sources 105 have some mechanism for recording or presenting audio information (for example, by providing signals capable of driving an audio reproduction mechanism such as an earphone, a hearing aid, a bone conduction transducer, a direct tympanic stimulator, a headphone set, a speaker, etc.). One skilled in the art would be able to create a similar architecture directed to textual processing or other group communication processing without undue experimentation after having read the disclosure herein.

Any of the plurality of audible sources 105 can include signal processing capability for converting analog audio information into digital audio information and for sending the audio information to the group communication server 103. These capabilities can be included as part of a microphone, a headset, provided by a portable audio processor, or provided by a server processor in wire or wireless communication with the microphone.

The group communication server 103 can be a component of a radio system, a wired, wireless and/or cellular telephone system, a component in an emergency control center, a server for an internet audio-based chat room, or a component in any individually addressable group audio system.

Figure 2:
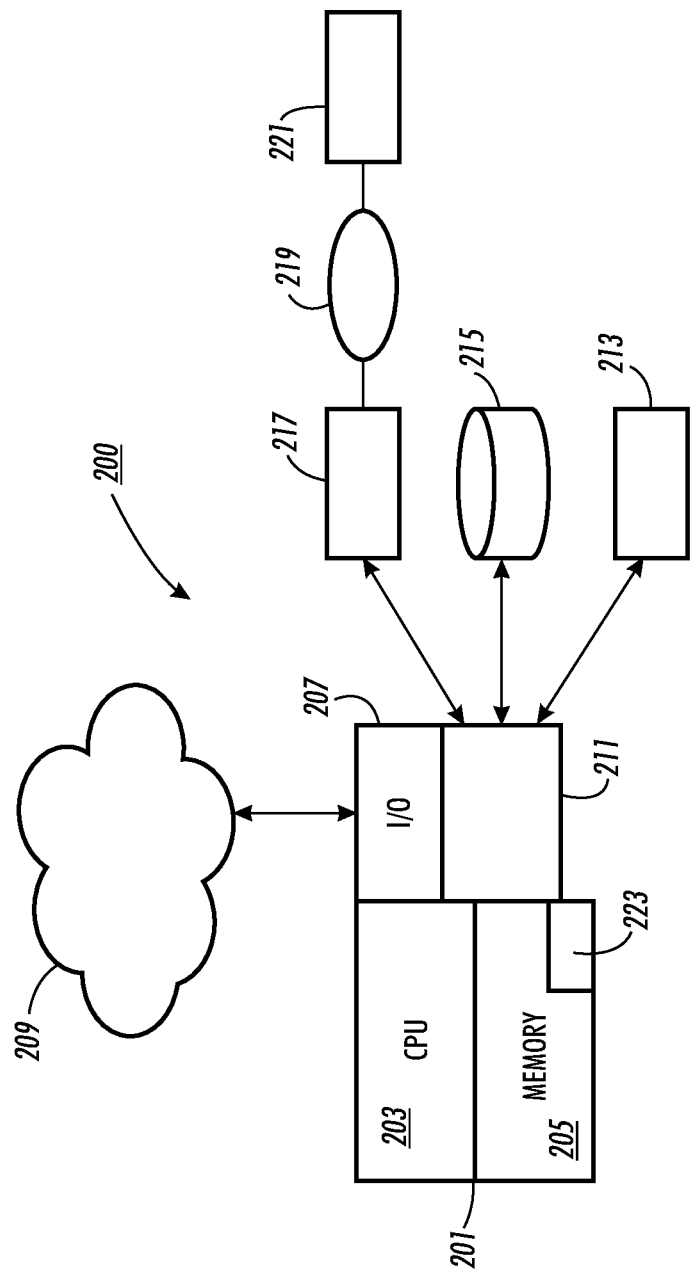
FIG. 2 illustrates a group communication server in accordance with an embodiment.

FIG. 2 illustrates a group communication server 200 that incorporates the invention. The group communication server 200 includes a computer 201 that incorporates a CPU 203, a memory 205, and a network interface 207. The network interface 207 provides the computer 201 with access to a network 209. The computer 201 also includes an I/O interface 211 that can be connected to a user interface device(s) 213, a storage system 215, and a removable data device 217. The removable data device 217 can read a computer readable media 219 that typically contains a program product 221. The storage system 215 (along with the removable data device 217) and the computer readable media 219 comprise a file storage mechanism. The program product 221 on the computer readable media 219 is generally read into the memory 205 as a program 223. In addition, the program product 221 can be provided from the network (generally encoded within an electromagnetic carrier wave—including light, radio, and electronic signaling) through the network interface 207.

One skilled in the art will understand that not all of the displayed features of the computer 201 need to be present for the invention. One skilled in the art will understand that the network transmits information (such as data that defines audible information as well as data that defines a computer program). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer usable data carrier.

Figure 3:
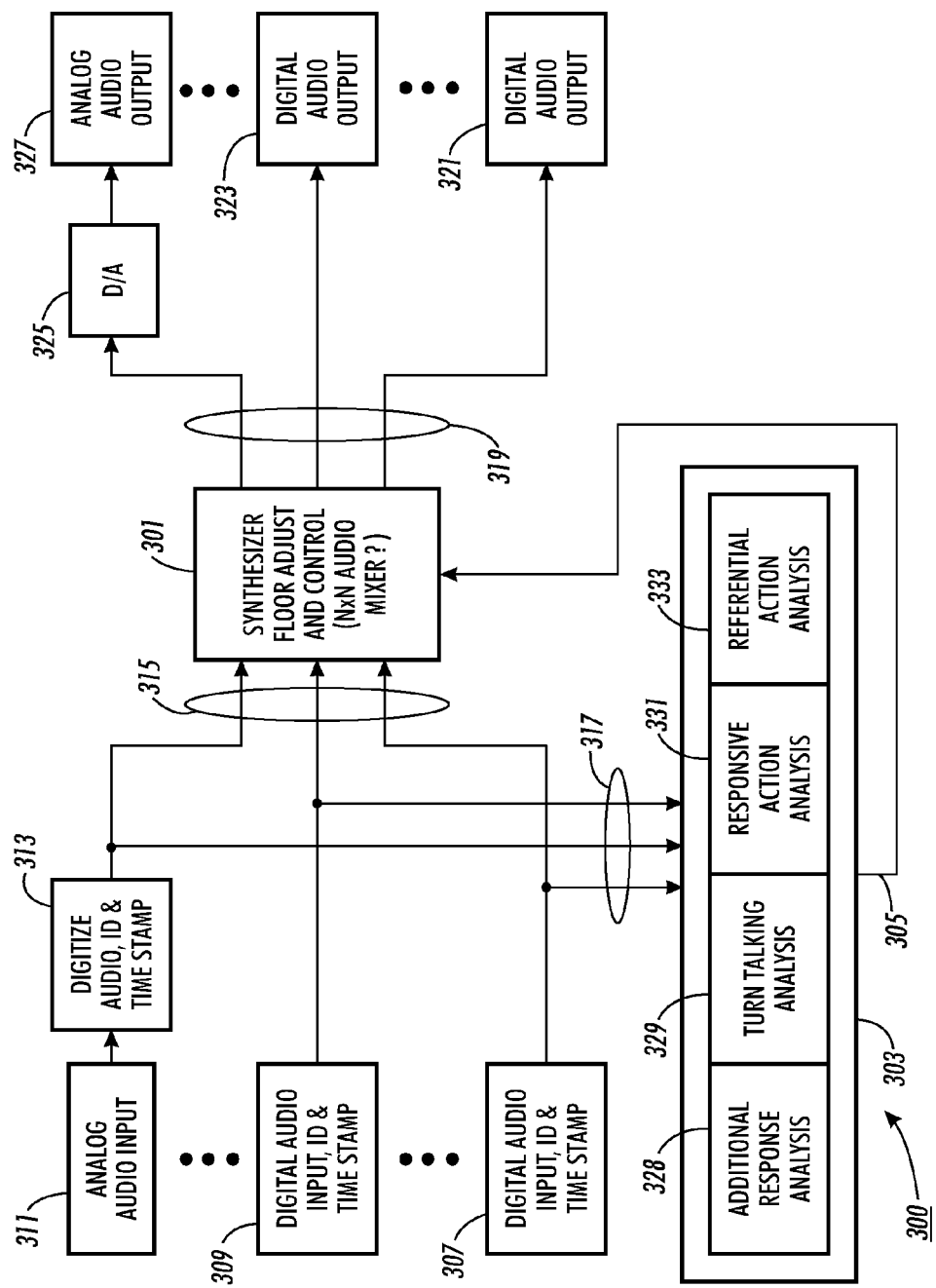
FIG. 3 illustrates a group communication server architecture in accordance with an embodiment.

FIG. 3 illustrates a group communication system architecture 300 that illustrates one embodiment of the invention. This architecture can be implemented in circuitry, in a suitably programmed computer, or using a combination of programmed computer and circuitry. A user is associated with a source and an output. A user's vocalizations are provided to an audio source and the vocalizations of every 'other user' (possibly modified) are mixed and presented to an output associated with the user for presentation to the user. Both the sources and the outputs can be "virtual" in that the result is a digitized audio packet that includes an identification (for example, the identification can be that of a user, a virtual bi-directional channel, or include separate identifiers for the source and output virtual channels) and a timestamp. The timestamp and the source/output identification can be added to the packet by a tagger.

The group communication system architecture 300 includes an audio mixer 301 that can be conditioned to mix digital audio from N sources to N or more outputs where the audio from each source can be individually controlled when mixed for each of the outputs. The audio mixer 301 can thus mix the various sources specifically for each output. This mixing can be controlled by a set of mixing parameters or floor controls.

Generally, there is an audio source and an output dedicated to each user (although outputs that are not associated with a source are contemplated by the inventors for monitoring purposes). In addition, additional inputs can be included that do not have a corresponding output (for example, computer generated system status messages, or override communications).

The group communication system architecture 300 also includes a floor analysis module 303 that is used to analyze data for conversational characteristics. The results of the floor analysis module 303 can be used to automatically determine establishment of conversational group membership. The floor analysis module 303 then effectuates the conversational floors by specifying the set of mixing parameters for the audio mixer 301. The set of mixing parameters are communicated from the floor analysis module 303 to the audio mixer 301 over a floor control path 305.

The group communication system architecture 300 includes a first digital audio source and tagger 307 through an $n^{th}$ digital audio source and tagger 309 and may include an analog source 311 that feeds an audio digitizer and tagger 313. The tagger portion of these elements inserts source identification and can insert time-stamp information into the digitized audio packets. These audio sources can be receivers that receive the audio streams.

The digitized and tagged audio data is provided to the inputs of the audio mixer 301 over one or more mixer audio data paths 315. The digital audio data is also provided, via one or more analysis audio data paths 317 to the floor analysis module 303. The floor analysis module 303 analyzes the available conversational characteristics (for example, of the audio data received over the one or more analysis audio data paths 317) to determine the values of the set of mixing parameters.

The audio mixer 301 communicates the mixed output audio over one or more output audio data paths 319 to a first digital audio output 321 through an $n^{th}$ digital audio output 323 and optionally over an audio digital to analog converter (D/A) 325 connected to an analog audio output 327.

One skilled in the art will understand that, although multiple sources and output are indicated in FIG. 3, once the audio packets are digitized and contain a source identifier, a single physical input/output communication mechanism (for example, a network interface) is sufficient to transmit or receive the packets. The relevant requirement is that the audio from each source is identified. That identification can be accomplished by a digitizing input mechanism, by electronics that is in communication with the digitizing input mechanism, or by electronics that is associated with a particular physical source input or other mechanisms well understood in the art. Furthermore, the digitized audio from a given source can be associated with a virtual device that provides an interface to the audio stream from that source. The separate paths indicated in FIG. 3 for the one or more mixer audio data paths 315, the one or more analysis audio data paths 317, and the one or more output audio data paths 319 can be a single path carrying digitized audio packets that are identified according to source. Such a one will also understand that there are a multitude of techniques for handling audio data and for temporally aligning the audio data each of which are contemplated for use by the inventors. Furthermore, the techniques related to temporally aligning the audio data can be performed by each of the plurality of audible sources 105, can be done at the group communication server 103 or in some combination.

An 'additional response analysis' module 328 can be included that receives non-audio data such as video information, biometric information, eye-tracking information etc. The 'additional response analysis' module 328 can analyze this data to determine conversational characteristics that can be correlated with the audio information provided by the one or more analysis audio data paths 317 as well as information developed by other modules in the floor analysis module 303. The analysis results of the 'additional response analysis' module 328 are incorporated with the other analysis performed by the floor analysis module 303 to control the audio mixer 301.

The floor analysis module 303 also analyzes conversational characteristics and can also contain one or more analysis modules such as a 'turn-taking analysis' module 329, a 'responsive action analysis' module 331, and/or a 'referential action analysis' module 333 as well as a conversational floor configuration thread as will be subsequently described primarily with respect to FIG. 7, FIG. 13, FIG. 15, and FIG. 17. The results of the analysis is used to control the floor controls and/or set of mixing parameters used by the audio mixer 301.

The first digital audio source and tagger 307 through the $n^{th}$ digital audio source and tagger 309 and the ID and time stamp portion of the audio digitizer and tagger 313 are used to identify the input source of the digitized data and can mark the data with the time it was received.

One skilled in the art will understand that other embodiments of the invention can use hybrid digital/analog circuitry for the audio mixer 301. In such an embodiment, the floor analysis module 303 could provide its own audio digitizers. Such a one will also understand that the first digital audio source and tagger 307 through the $n^{th}$ digital audio source and tagger 309 and the analog source 311 are generally associated with the corresponding output. Each source/output is usually associated with a user who performs vocalizations that are picked up by an input device (such as a microphone) and digitized. The user also listens to the audio produced by the corresponding audio output.

The audio information from each source/output to and from the group communication server 103 can be made available over one or more ports into the group communication server 103 but generally the digitized audio information is packetized and communicated over a network. In addition, there need not be a one-to-one correspondence between the sources and the outputs (thus allowing for monitoring an output, or for an overriding source).

Figure 4:
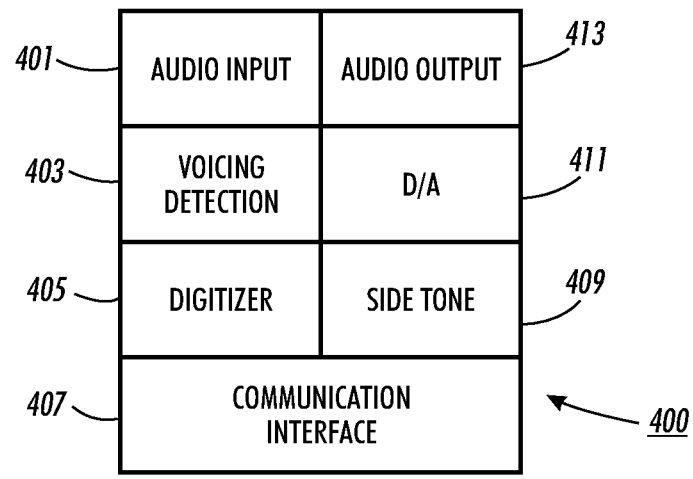
FIG. 4 illustrates a remote digital audio microphone system in accordance with an embodiment.

FIG. 4 illustrates a remote digital audio microphone system 400 that can be used to provide digitized audio data to any of the first digital audio source and tagger 307 through the $n^{th}$ digital audio source and tagger 309. The remote digital audio microphone system 400 includes an audio input 401, can include a voicing detector 403 to determine when input from the microphone should be processed, and a digitizer 405 that digitizes analog signals from the audio input 401 (possibly responsive to the voicing detector 403). In addition, the remote digital audio microphone system 400 includes a communications interface 407 that sends and receives information to the group communication server 103 over the network 101. In addition, the remote digital audio microphone system 400 can include an optional side tone generator 409 (that feeds some of the audio received by the audio input 401 to the audio output 413) and includes a D/A converter 411 for converting digital audio information received by the communications interface 407 into analog information that can be presented by an audio output 413 (such as a headphone or speaker). One skilled in the art will understand that FIG. 4 represents possible features in the remote digital audio microphone system 400 and that these features can be combined in many different ways. Furthermore, the arrangement of devices in FIG. 4 need not imply the order that signals are processed.

One skilled in the art will understand that the remote digital audio microphone system 400 need not be as fully featured as shown. It only need include the audio input 401, the audio output 413, and some means of communicating the audio information to and from the group communication server 103.

Figure 5:
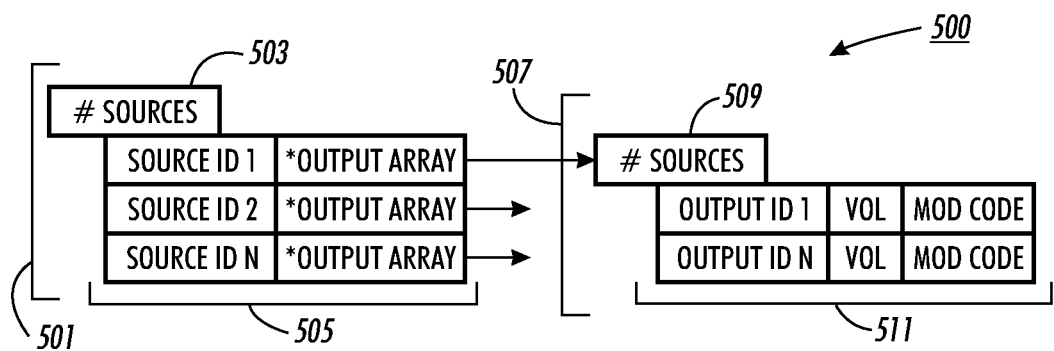
FIG. 5 illustrates an embodiment of a floor control data structure in accordance with a embodiment.

FIG. 5 illustrates a floor control data structure 500 that includes a source data structure 501 that has a number-of-sources field 503 and a source/output-structure-pointer array 505. The number-of-sources field 503 specifies the number of active sources (in some implementations this field can specify the total number of possible sources). The source/output-structure-pointer array 505 associates each source with a pointer to an output data structure 507. The output data structure 507 includes a number of outputs field 509 that specifies the number of outputs to which audio from the source is to be distributed. The contents of the number-of-sources field 503 and the output data structure 507 is generally expected to be the same (but can be different for transitional states or for special purpose applications). The output data structure 507 also includes an output control array 511 that can include an output identification field, a volume field and an audio modification field.

The source data structure 501 is used to distribute audio information from the associated source to each output as modified by the volume and audio modification fields for that output. The volume and audio modification fields are automatically adjusted by the floor analysis module 303 through the floor control path 305. Thus for each output, the audio mixer 301 can mix contributions from each source as specified by the floor control data structure 500.

The audio modification field is used to apply special effects to the mixed audio to help the user better distinguish audio originating from a different conversational floor as compared to audio originating from the user's current conversational floor. These special effects for the floor indication mechanism can include adding echo, intentional masking and/or other effects. This field can also be used to override the conversational floors for a communication (for example, for an override communication that must be heard by all). Furthermore the audio modification field (or an additional field) can include spatialization controls to change the apparent audio position of the audio source. Thus, in one embodiment, the audio from members of 'this user's' floor can always be auditorally placed in front of 'this user' while audio from other floors is placed to the side or behind 'this user'.

One skilled in the art, after reading the disclosure herein, can expand the floor control data structure 500 to support video focusing in a video conference situation. That is, as a conversational floor is established between participants of a video conferencing session, the members of the conversational floor have a different video representation than do the members of another conversational floor. These modifications can result in highlighting the views containing the 'other users' on 'this user's' conversational floor. The highlighting can be done by size, color, placement, etc. of the view. Furthermore, such a one will understand that in the textual communication environment, that the output control array 511 can contain fields that control the appearance of the text of the communication (for example, size, color, shading etc.) to indicate floor membership. Both the textual and video representations are examples of visual indications of floor membership. In addition, other visual representations of the floor configuration can be presented to the user(s) by graphical, textual, or other indicator mechanisms.

Describing now an embodiment of the group communication system architecture 300. This embodiment is described in the context of a multi-threaded procedural programming environment for use by a general-purpose computer. One skilled in the art will understand that there are many programming methodologies that can be used to program a general-purpose computer system in accordance to the group communication system architecture 300. In addition, such a one would understand that significant portions (or totality) of the group communication system architecture 300 can be implemented using special purpose circuitry.

Figure 6:
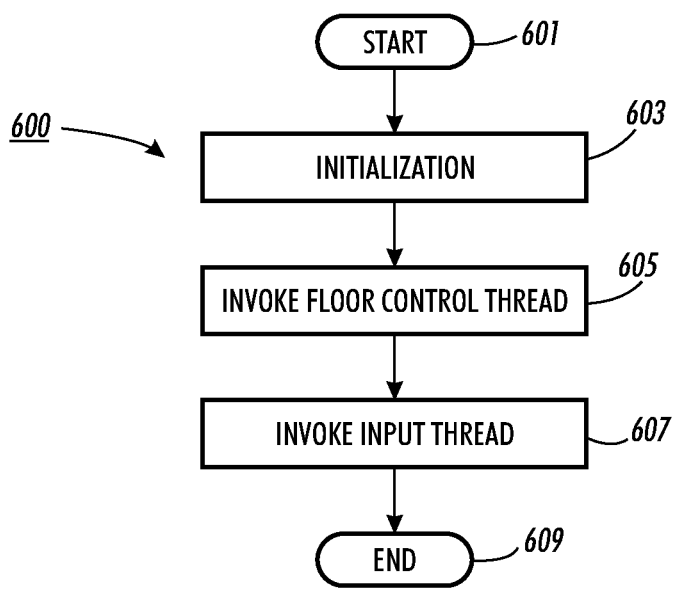
FIG. 6 illustrates a group communication server initialization thread in accordance with an embodiment.

FIG. 6 illustrates a 'group communication server initialization' thread 600 that is invoked as the group communication server 103 prepares to perform its function. The 'group communication server initialization' thread 600 initiates at a 'start' terminal 601 and continues to an 'initialization' procedure 603 that performs any required initializations (such as establishing appropriate data structures, enabling communications with the plurality of audible sources 105, and other initializations that would be apparent to one skilled in the art). After the 'initialization' procedure 603 completes, the 'group communication server initialization' thread 600 continues to an 'invoke floor configuration thread' procedure 605 that invokes the thread subsequently described with respect to FIG. 7 and an 'invoke source thread' procedure 607 that invokes the thread subsequently described with respect to FIG. 8. The 'group communication server initialization' thread 600 then completes through the 'end' terminal 609.

To automatically configure the audio mixer 301, each user's vocalizations are analyzed (as is subsequently described) and the results of the analysis are used to automatically modify the floor control data structure 500. In one embodiment, this analysis is performed by one or more threads-of-execution.

A procedure is a self-consistent sequence of computerized steps that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs a function that is equivalent to the function performed by a computer executing the instructions.

Figure 7:
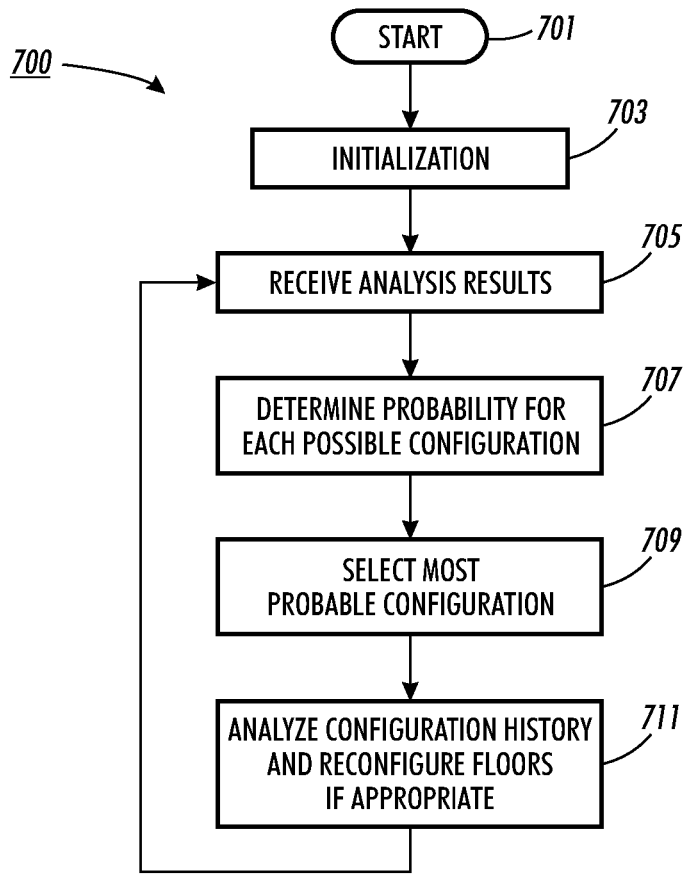
FIG. 7 illustrates a floor configuration thread in accordance with an embodiment.

FIG. 7 illustrates a 'floor configuration' thread 700 invoked by the 'invoke floor configuration thread' procedure 605 of FIG. 6 and that initiates at a 'start' terminal 701. This thread is responsible for receiving the results of the individual analysis modules, automatically determining and selecting the most likely configuration of audio sources from these results (thus determining conversational group membership), and for configuring the audio mixer 301 by adjusting values in the floor control data structure 500.

An 'initialization' procedure 703 provides any required initialization including the possible allocation and initialization of the floor control data structure 500 (if needed), initialization of the floor control path 305, the one or more mixer audio data paths 315, the one or more analysis audio data paths 317, and other initializations as would become apparent to one skilled in the art. After the 'floor configuration' thread 700 completes its initialization, it continues to a 'receive analysis results' procedure 705 that receives results from separate analysis threads such as those subsequently described with respect to FIG. 13, FIG. 15, and FIG. 17. Once a result from an analysis module is received, a 'determine configuration probabilities' procedure 707 determines the probability for at least some of the possible configurations that that configuration matches how the users are interacting in each conversational floor.

The per-configuration probabilities can be determined using a variety of methods. One method is that of maintaining a participant graph with a node for each user and with an edge between that user and each 'other user'. Each edge in the participant graph is weighted with the pair-wise probability that the two users connected by the edge are in conversation.

The configuration with the highest mean weight is the most probable configuration. This example is subsequently described with respect to FIG. 18.

One skilled in the art will understand that as the number of sources increase, that the number of possible configuration combinations becomes much more numerous. While the probability for each possible configuration can be determined for small numbers of sources, as the number of sources increase the number of configurations can be managed using techniques known in the art.

Once the probabilities are determined for the relevant configurations, a 'select most probable configuration' procedure 709 selects the current most probable configuration. Then, a 'configure floors' procedure 711 analyzes the past history of the selected configurations and, if appropriate, will reconfigure the set of mixing parameters in the floor control data structure 500 (thus, changing the conversational floor configuration).

The 'configure floors' procedure 711 can also apply some hysteresis-like effects so that the conversational floor configuration does not change too rapidly (which results in a fluttering effect). Thus, it is useful to maintain a configuration for a minimum number of timeslices. A variety of methods can be used to determine this. For example, one option is to require a single configuration be maintained for a specified number of consecutive timeslices, another approach is to require a "random walk" distance of a specified number of timeslices before a change in the selected configuration is allowed (for example, if configuration A is the currently selected configuration, configurations B, C or D must be chosen a net total of 30 more timeslices relative to A before a configuration other than A can be selected). Other heuristic analysis can also be performed to help keep the conversational floors stable without interfering with the ability for the users in the conversational environment to have side conversations or otherwise switch conversational floors. The 'configure floors' procedure 711 changes the values in the floor control data structure 500 to change the conversational floor configuration. After the 'configure floors' procedure 711, the 'floor configuration' thread 700 continues back to the 'receive analysis results' procedure 705 to receive and process more analysis results.

Additional methods can be used to control the 'configure floors' procedure 711, in accordance with a state-based conversational model. For example, transitions between floor configurations can be controlled using deterministic state machines. One way to do so is to use deterministic finite state machines in which individual states represent particular floor configurations, but it is also possible for multiple states to correspond to particular floor configurations and vice versa. Alternatively, transitions between floor configurations can be controlled using probabilistic state machines, such as those based on Markov models or Hidden Markov Models (HMMs).

It should also be apparent that the 'configure floors' procedure 711 need not perform all types of analysis at the same temporal granularity used in the rest of the system. For example, even if audio samples are processed using a fixed 30 ms time granularity, the selection process for floor configuration can use features corresponding to variable-sized time units. One such approach uses so-called "segment-based" analysis, in which features are combined with an explicit time label indicating the duration for which the feature value is valid (segment length).

Users can be provided with tools to specify parameters that influence the operation of the 'floor configuration' thread 700. For example, particular preferences can be provided to specified users such that they are members of all conversational floors. In addition, vocalizations from some designated members (override members) may be given an override characteristic such that vocalizations from the override member cause other member's vocalizations to be silenced for the duration of the override member's communication. Another example is the provision of a "hold" mechanism that allows the user to require the 'floor configuration' thread 700 to maintain its current floor configuration with respect to that user. This "hold" mechanism and other useful mechanisms to override the automatic floor control can be invoked by traditional explicit user commands either vocal or by explicit user action. Further, in some embodiments, the system can be forced into a manual mode where the floor membership is explicitly controlled by the users.

Figure 8:
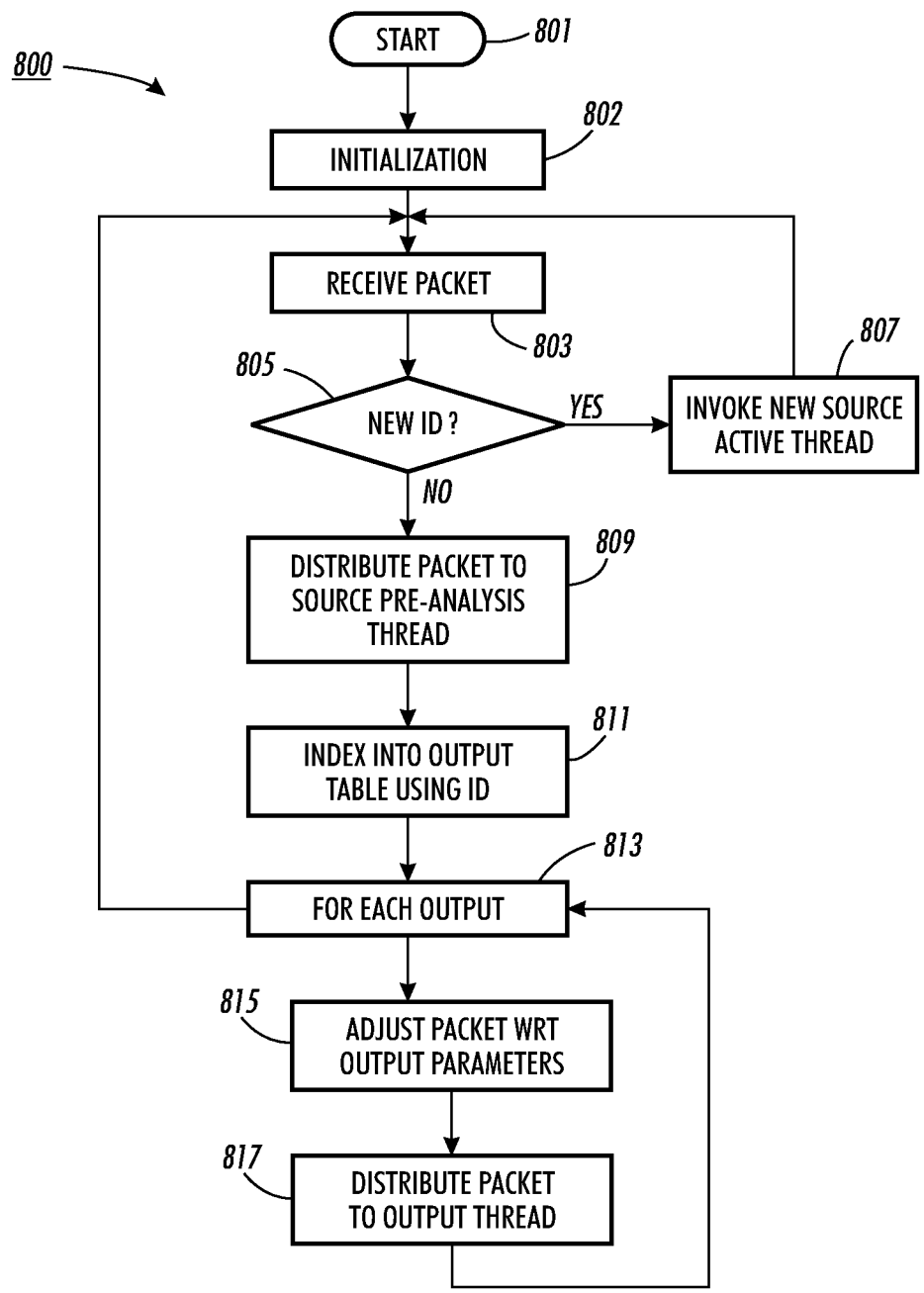
FIG. 8 illustrates an audio source handler thread in accordance with an embodiment.

FIG. 8 illustrates an 'audio source handler' thread 800 invoked by the 'invoke source thread' procedure 607 of FIG. 6 and that initiates at a 'start' terminal 801 and continues to an 'initialization' procedure 802 that performs any one-time initialization for the thread. Then the 'audio source handler' thread 800 continues to a 'receive packet' procedure 803 that receives a packet of digitized audio information from any of the one or more mixer audio data paths 315. A 'new identification' decision procedure 805 determines whether the packet was from a new source (by examining the packet identification information inserted in the packet by the ID and time stamp portion of the source input). If a new source is detected, the 'audio source handler' thread 800 continues to an 'invoke new active source thread' procedure 807 that starts a thread (as is subsequently described with respect to FIG. 9) for the newly activated source.

Figure 10:
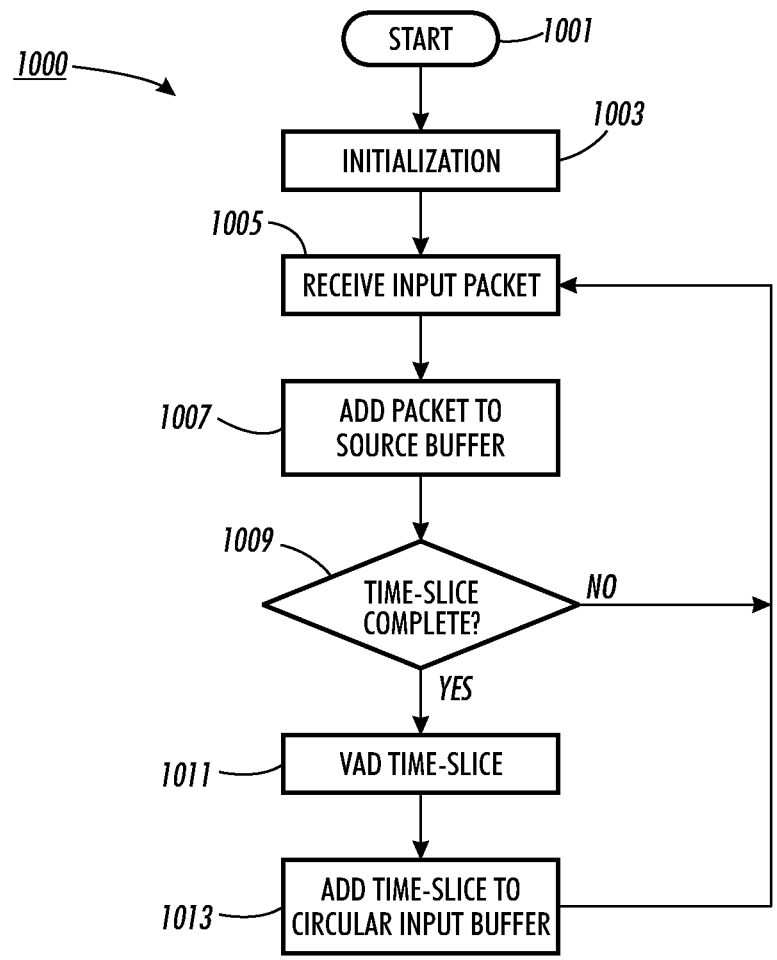
FIG. 10 illustrates a pre-analysis thread in accordance with an embodiment.

Otherwise, if the packet identifies its source as one that has been previously active, the 'audio source handler' thread 800 continues to a 'distribute packet to source pre-analysis thread' procedure 809 that sends a copy of the packet to the pre-analysis thread that is described with respect to FIG. 10. An 'index into output table' procedure 811 accesses the floor control data structure 500 to access the output control array 511 for audio information from the identified source. An 'iterate each output' procedure 813 then iterates each output in the output control array 511.

For each iterated output, an 'adjust packet WRT output parameters' procedure 815 creates a copy of the packet as adjusted with respect to the contents of the volume field and the modification code field. Next, a 'distribute packet to output thread' procedure 817 distributes the adjusted packet to the appropriate output thread. The output thread is subsequently described with respect to FIG. 11. After adjusted copies of the source packet have been distributed to the appropriate output threads (generally all of the output threads, but if the volume field indicates that the output is to have no contribution from this particular source, the packet need not be distributed to that output), the source packet can be released.

One skilled in the art will understand that the packet adjustment can be done by the output thread instead of by the 'audio source handler' thread 800.

Once the 'iterate each output' procedure 813 completes the iteration, the 'audio source handler' thread 800 continues back to the 'receive packet' procedure 803 to receive the next audio packet.

One skilled in the art will understand that in another embodiment copies of the source packet can be first distributed to the output queues, and then the original packet can be sent to the 'distribute packet to source pre-analysis thread' procedure 809. Both approaches provide the equivalent functionality, but one may be more conducive to parallelization.

It should be noted that the described implementation will drop the first audio packet from a newly activated source. This is a one-time occurrence. One skilled in the art after having read this description could re-flow the initial packet back onto the queue because the packet is already time-stamped.

Figure 9:
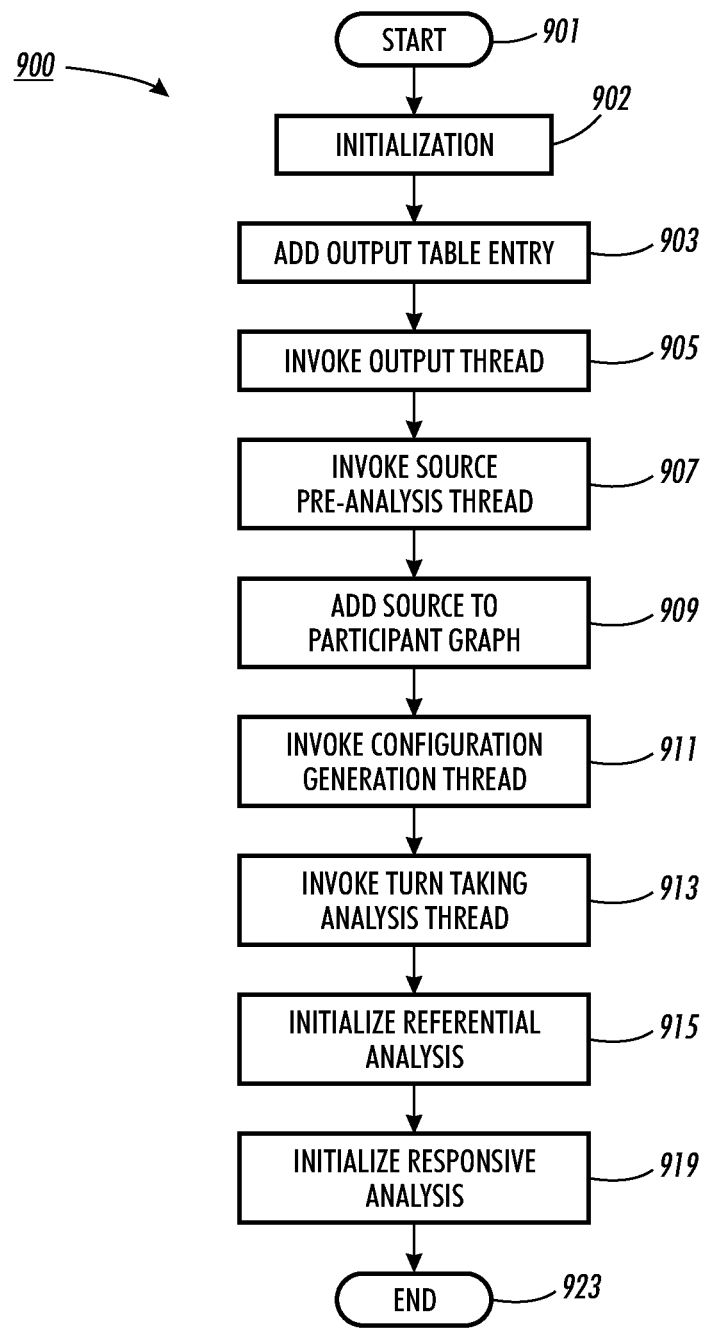
FIG. 9 illustrates a new active source active thread in accordance with an embodiment.

FIG. 9 illustrates a 'new active source' thread 900 that is invoked by the 'invoke new active source thread' procedure 807 of FIG. 8. The 'new active source' thread 900 is used to initialize the threads for handling a new user, for modifying the participant graph, and for initializing the analysis thread needed for the new user.

The 'new active source' thread 900 initiates at a 'start' terminal 901. An 'initialization' procedure 902 performs any required initialization. An 'add output table entry' procedure 903 updates the floor control data structure 500 to reflect the existence of the newly active source. Once the floor control data structure 500 is updated, the 'new active source' thread 900 can invoke the user output thread (that is subsequently described with respect to FIG. 11) through an 'invoke output thread' procedure 905. Once the user output thread starts execution, the new user will start to hear audio responsive to the initialization performed when the 'add output table entry' procedure 903 initialized the new entry in the floor control data structure 500.

An 'invoke source pre-analysis thread' procedure 907 invokes the pre-analysis thread that is subsequently described with respect to FIG. 10. An 'add source to participant graph' procedure 909 adds the newly activated source to the participant graph (as a new user) and an 'invoke configuration generation thread' procedure 911 invokes the configuration generation thread that is subsequently described with respect to FIG. 12.

Figure 13:
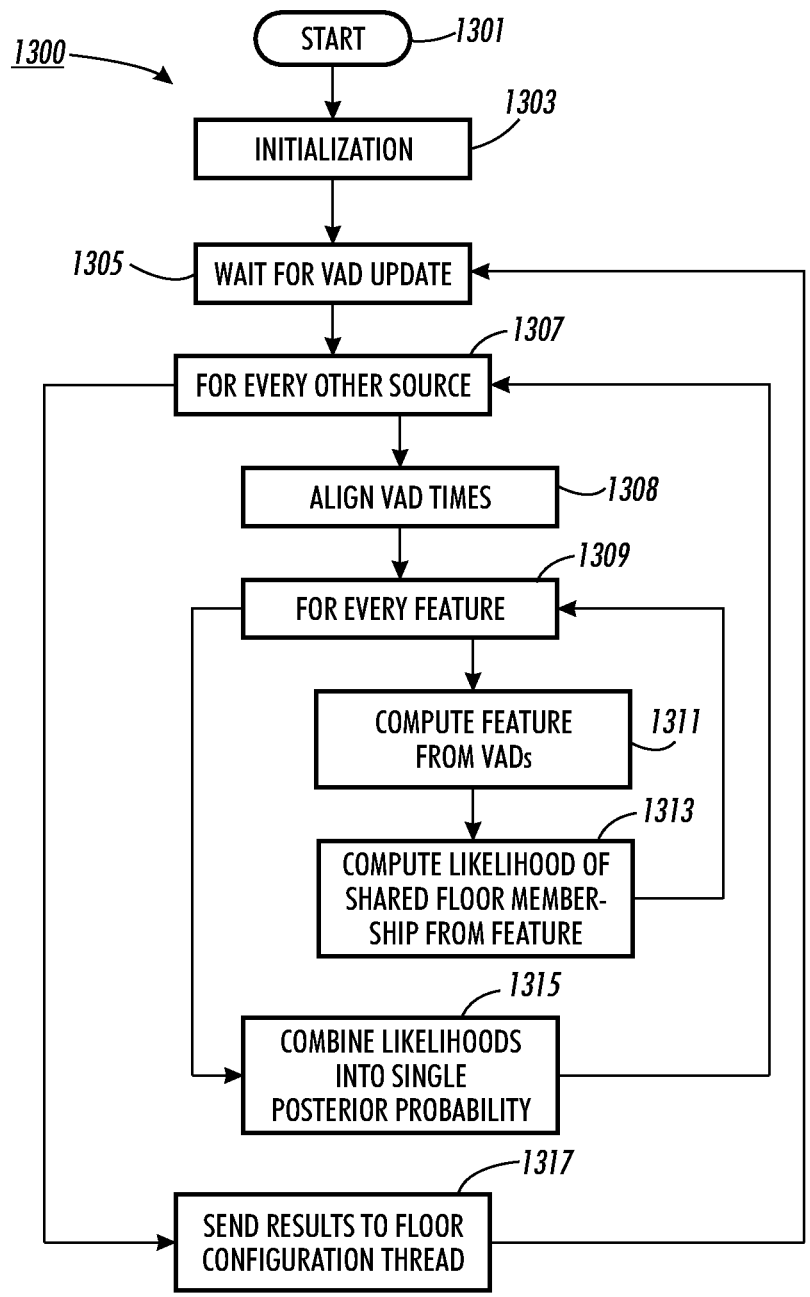
FIG. 13 illustrates a turn-taking analysis thread in accordance with an embodiment.

An 'invoke turn-taking analysis thread' procedure 913 then starts the turn-taking analysis thread that is subsequently described with respect to FIG. 13.

An 'initialize referential analysis' procedure 915 and an 'initialize responsive analysis' procedure 919 then invoke threads for initializing the referential analysis and responsive analysis threads as are subsequently described with respect to FIG. 14 and FIG. 16 respectively.

One skilled in the art will understand that other analysis threads, configuration threads, or capability threads can also be invoked for the new user at this time.

Finally, the 'new active source' thread 900 completes through an 'end' terminal 923. At this point, the audio mixer 301 is conditioned to add the audio received by the newly enabled source to the mix generated for each of the outputs. Thus, the user associated with the audio source will be able to hear the audio corresponding to the default mix. The configuration generation thread has been activated, and once the configurations that incorporate the new source are generated, and the analysis modules initialized, the floor analysis module 303 will be able to adjust the mix for the new user.

FIG. 10 illustrates a 'pre-analysis' thread 1000 that can be used to accumulate a timeslice of the received audio data and to perform an analysis of when the audio data represents a vocalization. To summarize, digital audio packets are received (sent by the 'distribute packet to source pre-analysis thread' procedure 809 of FIG. 8) and accumulated in a source-specific buffer until a timeslice of about 30 milliseconds of audio is captured. Once the timeslice is captured, it is analyzed to detect periods of vocalization (by a voice activity detector (VAD)). The VAD analysis generates a bit vector that represents whether vocalization is detected for the millisecond corresponding to the bit position in the vector. Each VAD vector is added to a VAD buffer for use by the analysis routines.

The 'pre-analysis' thread 1000 is invoked by the 'invoke source pre-analysis thread' procedure 907 of FIG. 9, initiates at a 'start' terminal 1001, and continues to an 'initialization' procedure 1003 to perform any required initialization. A 'receive source packet' procedure 1005 receives the audio packet from the 'distribute packet to source pre-analysis thread' procedure 809. Next, an 'add packet to source buffer' procedure 1007 adds the received audio packet to the timeslice data. A 'timeslice complete' decision procedure 1009 determines whether the timeslice buffer is full, and if the timeslice buffer is not full, the 'pre-analysis' thread 1000 continues back to the 'receive source packet' procedure 1005 to accept the next packet.

However, if the 'timeslice complete' decision procedure 1009 determines that the timeslice is complete, the 'pre-analysis' thread 1000 continues to a 'VAD timeslice' procedure 1011 that applies a voice activity detector (VAD) to the data in the timeslice to determine what portions of the timeslice correspond to vocalization. The 'VAD timeslice' procedure 1011 can also use information from a vocalization detection mechanism (for example, using a signal derived from a throat microphone). Once the VAD analysis completes for the timeslice, the results of the analysis are added to a VAD buffer. An 'add timeslice to circular source buffer' procedure 1013 then adds the timeslice audio data to a circular buffer (or other limited-size buffer mechanism) so that the audio information from the timeslice data is available to the other analysis threads. Finally, the 'pre-analysis' thread 1000 returns to the 'receive source packet' procedure 1005 to receive the next audio packet from its source.

The VAD is tuned to use one-millisecond frames to achieve the required temporal resolution. Other means, such as the use of multiple partially-overlapping frames at lower resolution, can be used to produce the required temporal resolution. The use of the VAD buffer is subsequently described with respect to FIG. 13. The VAD data is one example of a stream of feature data that results from analysis of the conversational communication. Other feature data can be generated by other analysis of VAD data, the audio, or other conversational characteristics. The feature data can be analyzed over a communicative interval.

Figure 11:
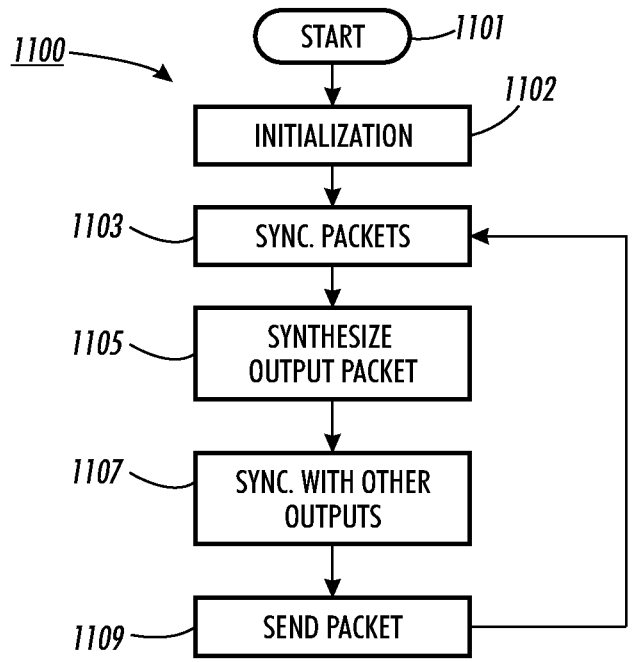
FIG. 11 illustrates a user output thread in accordance with an embodiment.

FIG. 11 illustrates a 'user output' thread 1100 that is invoked by the 'invoke output thread' procedure 905 and that initiates at a 'start' terminal 1101. The purpose of the 'user output' thread 1100 is to receive modified packets (modified as described with respect to the 'adjust packet WRT output parameters' procedure 815) from the 'distribute packet to output thread' procedure 817 from each of the sources. The packets from each source are synchronized and mixed to generate the audio output for the user. The audio output for one user can be synchronized with the other outputs (so that each output sends the corresponding information at substantially the same time) and then the packet is sent to the output for presentation to the user.

After initiation, the 'user output' thread 1100 continues to the 'initialization' procedure 1102 to perform any required one time initialization. A 'synchronize packets' procedure 1103 receives the modified audio packets from the 'distribute packet to output thread' procedure 817 and synchronizes them prior to mixing. Once the packets are synchronized, a 'mix output packet' procedure 1105 combines each of the adjusted source packets to generate an output packet. Once generated, a 'synchronize with other outputs' procedure 1107 can synchronize the output packet with the packets for the other outputs. Then a 'send output packet' procedure 1109 sends the output packet for presentation to a user (possibly after synchronization with the other outputs).

Figure 12:
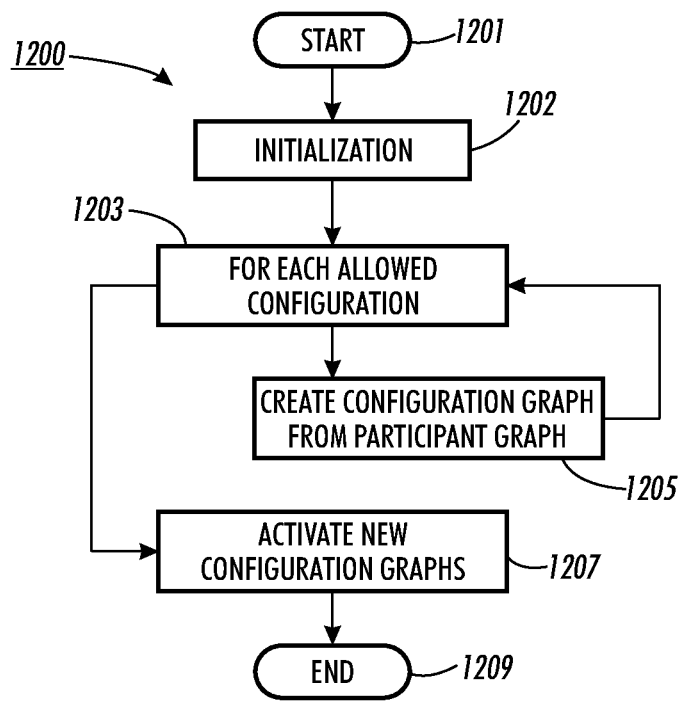
FIG. 12 illustrates a configuration generation thread in accordance with an embodiment.

FIG. 12 illustrates a 'configuration generation' thread 1200 that is invoked by the 'invoke configuration generation thread' procedure 911, that initiates at a 'start' terminal 1201 and continues to an 'initialization' procedure 1202. Next, an 'iteration' procedure 1203 iterates each allowed configuration.

As each allowed configuration is iterated, a 'create configuration graph' procedure 1205 creates a graph in memory representing the allowed configuration. This can include pre-weighting the edges of the configuration based on the weighting of the corresponding edges of the existing participant graph. Once the graphs from all the allowed configurations are created, an 'activate new configuration graphs' procedure 1207, classifies any new user(s) as a lurker (a user who has not sufficiently interacted with the other users to determine a conversational floor), renormalizes the probabilities to account for the new user(s), then conditions the analysis threads to use the new configurations, and releases the previous graphs. The 'configuration generation' thread 1200 then completes through an 'end' terminal 1209.

One skilled in the art will understand that as the number of participants increases, the number of possible combinations grows very rapidly. The 'iteration' procedure 1203 in some embodiments can provide a limitation in the number of possible configurations that are actually iterated.

The 'initialization' procedure 1202 in some configurations will only allow one copy of the 'configuration generation' thread 1200 to execute at a time because the generation of the configuration graphs can take considerable computing resources. In such an embodiment, the 'initialization' procedure 1202 remembers that a subsequent request has been made while a prior request is being serviced and will condition the 'configuration generation' thread 1200 to execute again after the configuration graphs from the prior request are activated.

The following is directed to the analysis performed on the audio information to determine the configuration probabilities used to establish conversational group membership and to set the floor control data structure 500.

One skilled in the art will understand that there can be considerable latency between the time one user makes a vocalization and the time that other users hear the vocalization. This delay is contributed to (for example) by the processing times required to digitize the vocalization, to send the digitized vocalization to the group communication server 103, the time required for the group communication server 103 to process the vocalization, and to send it to the other users. This delay needs to compensate for by many of the subsequently described analysis procedures. It also means that the analysis of two users is generally not symmetrical (the analysis of whether user A is responding to user B is different from the analysis of whether user B is responding to user A as in each case, the response is to what the user heard and the timeframe of that hearing).

One aspect of the invention is that of establishment of conversational group membership. "Establishment" may be expressed in a variety of ways based on known reasoning techniques. For example, membership may imply a binary classification ("users X and Y are in conversational floor A"), or a belief such as "user X is in conversation with user Y with probability P."

To determine a conversational group membership, one aspect of the invention monitors each user's vocalizations. Thus, when 'this user' mentions another user's name at the beginning of 'this user's' vocalization, the probability is increased that 'this user' and the named 'other user' are in a conversation. This is referential analysis. Furthermore, if 'this user' is making backchannel vocalizations (vocalizing "words" such as, but without limitation, "uh-huh", "OK", "yep" etc.) with respect to the vocalization of the 'other user', it is more probable that 'this user' and the 'other user' are in communication. This is responsive analysis. Finally, if 'this user' and the 'other user' are exhibiting turn-taking behavior, it is much more probable that 'this user' and the 'other user' are in communication.

One aspect of the invention analyzes data for conversational characteristics. These characteristics include those that can be determined from analysis of the audio information from a subset of the audible sources or from physiological responses to the conversation (for example—but without limitation, responses measured by a biometric device and/or information from an eye-tracker device).

Some aspects of the invention require audio phrase-recognition capability (that is, the ability to recognize a user's name from an audio stream or to recognize specific short vocalizations from a user). Thus, these aspects of the invention do not require "deep" language understanding but instead use word/phrase recognition technology (however, the use of "deep" language understanding could be used to improve the analysis).

Each of the analysis modules determines quantitative measures corresponding to the measurement of a particular "feature." For example, one feature used by the turn-taking analysis is the amount of overlapping speech produced by speakers A and B over a specified time window.

The results of the analysis of user vocalizations or other conversational characteristics are combined on an ongoing basis using reasoning techniques known in the art. For example, raw quantitative features can be used to compute likelihoods that are combined to compute a posterior probability that speakers are or are not participating in the same conversational floor.

The quantitative features can be computed in a pair-wise fashion; once the pair-wise probabilities are computed, they can then be used to compute a conversational floor configuration that is most consistent with all of the evidence developed from the features. One way to do this is to divide a set of speaking users (speakers) into disjoint sets (for example, each disjoint set containing two or more speakers). Users who have not yet (or not recently) provided enough vocalization to be placed in a conversational floor (lurkers) can receive all communications, can be placed in a particular conversational floor, or otherwise handled in a default manner.

One algorithm to create the sets is to enumerate all possible configurations of such sets where each configuration is represented as a completely connected weighted graph in which the nodes are users and the edge weights are the posterior probabilities that the connected users are communicating; the configuration with the highest mean edge weight is the most likely configuration for the speakers.

Once the most probable configuration is determined (and in some embodiments after considering a lagging or smoothing effect to the change of configuration) the set of mixing parameters for the audio mixer 301 characteristics are changed (for example, by changing the values in the floor control data structure 500) to enhance the output for each user dependent on the user's conversational floor (as has been previously described with respect to FIG. 7). In one embodiment, these changes enhance the contribution from each of the users in the same conversational floor as the listener while degrading the contribution from each of the users that are not in the same conversational floor as the listener (other changes can be envisioned). These enhancements and derogations are specified by the values in the "mod code" field of the output data structure 507 and can include:

(a) Increasing the volume of the vocalizations corresponding to members of the group and decreasing the volume of non-member vocalizations.

(b) Applying conventional audio effects to "highlight" members' vocalizations or "muddy" nonmembers' vocalizations.

(c) Obfuscating (partially or completely) the vocalizations corresponding to non-members. For example, using the block-scrambling algorithm of Smith & Hudson, *Low Disturbance Audio For Awareness and Privacy in Media Space Applications*, ACM Multimedia 95—Electronic Proceedings, Nov. 5-9, 1995.

(d) Suppressing all conversations except for an override communication.

(e) Adding additional audio cues indicating floor membership.

One skilled in the art will understand that additional fields can be added to the output data structure 507 to enable other types of indications of floor membership. For textual communication, for example, the floors can be distinguished by changing the typeface, the color, the size, shading or changing any other textual parameter. For video indications of floor membership, the presentation of the video representing the user can be adjusted such as by grouping the video of members on the floor together, by changing the image size, brightness, contrast, rotation, outline, framing, frame rate, and/or by having some other graphical connections between the members of each floor (for example, lines).

Turning now to the further discussion of some of the analysis aspects of the invention. FIG. 13 illustrates a 'turn taking analysis' thread 1300 that determines when users are taking turns talking with each other.

The 'turn taking analysis' thread 1300 is invoked by the 'invoke turn-taking analysis thread' procedure 913, initiates at a 'start' terminal 1301 and continues to an 'initialization' procedure 1303 that performs any required initialization. Then the 'turn taking analysis' thread 1300 continues to a 'wait for VAD update' procedure 1305 that delays until at least one new entry is added to the VAD buffer by the 'add timeslice to circular source buffer' procedure 1013. Once the new VAD entry is added, the 'turn taking analysis' thread 1300 continues to an 'iterate every other source' procedure 1307 that iterates over every source other than the source associated with the 'turn taking analysis' thread 1300. For each other source, an 'align VAD times' procedure 1308 temporally aligns 'this user's' VAD and the 'other user's' VAD so that the subsequent feature determination uses the same time base (thus synchronizing portions of the two audio streams). Next, an 'iterate every feature' procedure 1309 invokes every module that computes a quantitative value related to 'this user' and the 'other user'.

For each iterated feature, a 'determine feature from VADs' procedure 1311 examines the VADs to determine quantitative measurements of turn-taking characteristics. Each feature can analyze an arbitrary portion of the two users' VAD buffers.

Example features include those that: (1) indicate that two speakers are in the same conversational floor (for example, but without limitation, by detecting when one speaker starts vocalizing at a transition relevance place (TRP) of another speaker, and by detecting when one speaker has anticipated a TRP of another speaker, etc.); and (2) indicate that two speakers are not in the same conversational floor (for example, but without limitation, by detecting sustained periods of overlapping speech with the two speakers, and by detecting a lack of correlation between the speakers with respect to starting their speech at TRPs, etc.).

One skilled in the art will understand that temporally aligning the VADs can be as simple as specifying a starting bit location in the VAD buffer for each of the VADs.

A 'determine likelihood of shared floor' procedure 1313 then determines the likelihood from the quantitative values returned from the feature that 'this user' and the 'other user' share a conversational floor. The likelihoods for a feature can be determined in various ways. One such way is by comparing the measured feature value with a distribution of likelihoods for that feature.

After all the features are iterated, the 'turn taking analysis' thread 1300 continues to a 'determine single posterior probability' procedure 1315 that evaluates and combines the likelihoods and generates a single posterior probability that 'this user' and the 'other user' are in the same conversational floor. This can be done using a variety of methods (such as multiplying the likelihoods from statistically independent features, and/or other ways known in the art to generate a posterior probability).

When all the 'other users' have been iterated, the 'turn taking analysis' thread 1300 continues to a 'send result to floor configuration thread' procedure 1317 that sends the results of the analysis to the 'floor configuration' thread 700 and the 'turn taking analysis' thread 1300 returns to the 'wait for VAD update' procedure 1305 for the next analysis iteration.

The VAD buffer is large enough to account for the maximum time interval examined by any of the feature modules iterated by the 'iterate every feature' procedure 1309 as well as the amount of relative time adjustment required to temporally align the 'this user's' VAD buffer with the 'other user's' VAD buffer by the 'align VAD times' procedure 1308. In some embodiments, the VAD buffer is large enough to store on the order of 30 seconds of VAD information.

The amount of time required for alignment of 'this user's' and the 'other user's' VAD buffer is variable, but is of the order of 350 milliseconds.

Note that the pair-wise probabilities for the two users need not be symmetric. The feature computation from user 1 to user 2 is generally different from the feature computation from user 2 to user 1 because user 1 and user 2 VAD buffers are temporally aligned differently.

Another way to make probabilistic inferences of conversational group membership (that is whether two users are in the same conversational floor) is when one user vocalizes an identifier of another user or identifiable group of users (for example, a proper name, nickname, call sign, group name etc.). Some of these inferences include the use of audible identifiers when addressing a vocalization (for example, "Jim, I need . . ."), change in vocalization volume and/or other techniques. In this case, the principle is that a speaker tends to address certain conversational turns to specific recipients by using the recipients' proper names early in the turn. This happens frequently during the first turn of a given schism (the schism-inducing turn). That is, when a speaker is initiating a schism and wishes to involve another user, it is common for the initiating speaker to name the initial listening user. Word-spotting technology provides a sufficient capability to recognize these names. However, full speech recognition will improve reliability. Note that the system need not know what names actually correspond to what speakers—instead, it is sufficient to recognize that names are being used, since it is the use of names at the start of a vocalization that marks a potential schism. A wordspotting tool or a limited-vocabulary speech recognition engine can therefore be trained using lists of known proper names instead of the proper names of the actual speakers.

This mechanism is particularly important if one wishes to identify the first turn of such schisms before the schism-inducing turn ends.

Furthermore, the initial vocalization in a given sequence of turns of talk usually has greater speech energy amplitude (volume level) than the immediately preceding turns in the previous sequence. This can be a means of gaining a new addressee's attention, or a way of asserting one's right to take the turn. In either case, the act of raising one's volume is directed toward a recipient or recipients to bring the schisming act to their attention. Like the use of proper names, this is a means of identifying possible schism-inducing turns—schism-inducing turns will begin new turn sequences, though not all new turn sequences involve schisms. Features are used to compute conversational floor configurations as described for the turn taking analysis previously described with respect to FIG. 7 and FIG. 13.

Figure 14:
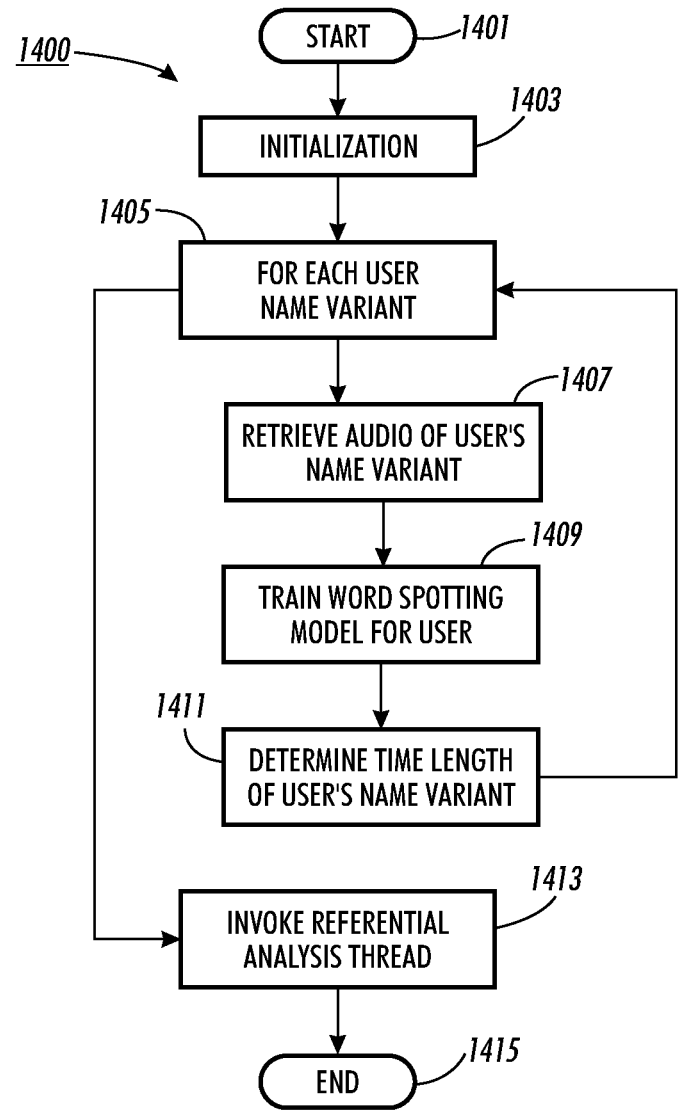
FIG. 14 illustrates a referential-action analysis initialization thread in accordance with a embodiment.

FIG. 14 illustrates a 'referential action analysis initialization' thread 1400 that is invoked by the 'initialize referential analysis' procedure 915 and initiates at the 'start' terminal 1401. The 'referential action analysis initialization' thread 1400 then continues to an 'initialization' procedure 1403 that performs any required initialization. Then an 'iterate user name variants' procedure 1405 iterates over each variant of 'this user's' name.

For each variant of the user's name, a 'retrieve audio of user name variant' procedure 1407 retrieves audio information from storage that is that of one variant of the user's name. This can include the given name of the user, an identifier of a group of users, a nickname and/or a handle.

Once the audio of the user's name variant is retrieved, a 'train wordspotting model for user name variant' procedure 1409 processes the audio data and trains the model to recognize the name variant. Depending on the model being used, every 'other user' may need to provide their own sample of 'this user's' name variant. Other models can be used that will use the name variant as spoken by 'this user' and allow 'other user's' use of the name to be recognized. In some embodiments, the wordspotting model is previously trained to recognize common names.

After the wordspotting model is trained, a 'determine time-length of user name variant' procedure 1411 determines the time required to vocalize the user's name variant.

After all the user's name variants have been processed, the 'referential action analysis initialization' thread 1400 continues to an 'invoke referential analysis thread' procedure 1413 that actually performs the referential analysis and that is subsequently described with respect to FIG. 15. Finally, the 'referential action analysis initialization' thread 1400 completes through an 'end' terminal 1415. One skilled in the art will understand that some embodiments need not train the wordspotting model as each new input is activated, but can instead (or in conjunction with) use an initially trained wordspotting model.

The 'train wordspotting model for user name variant' procedure 1409 trains a wordspotting model for one or more forms of the 'other user's' proper name. This can be done using techniques that apply, for example, Hidden Markov Models (HMM), and in particular HMM techniques that can train models dynamically. Wordspotting differs from full speech recognition in that it only involves detecting the presence of a limited number of specific words (sounds) in an audio stream as opposed to recognizing all words and building a linguistic model of what is being said. One skilled in the art will understand that to separate desired words from background sounds (those other than the desired words), some reasonably large amount of each user's speech may be required to statistically characterize it (e.g., to create a "background HMM"). Some algorithms require that the recording of 'this user's' name must be spoken by each 'other user' which is not unreasonable if the users use the system frequently and use it repetitively with each other (e.g., groups of friends who often speak to each other). In any case, more recent advances in speaker-independent speech recognition technologies can be applied here since the word in question is known in advance.

Figure 15:
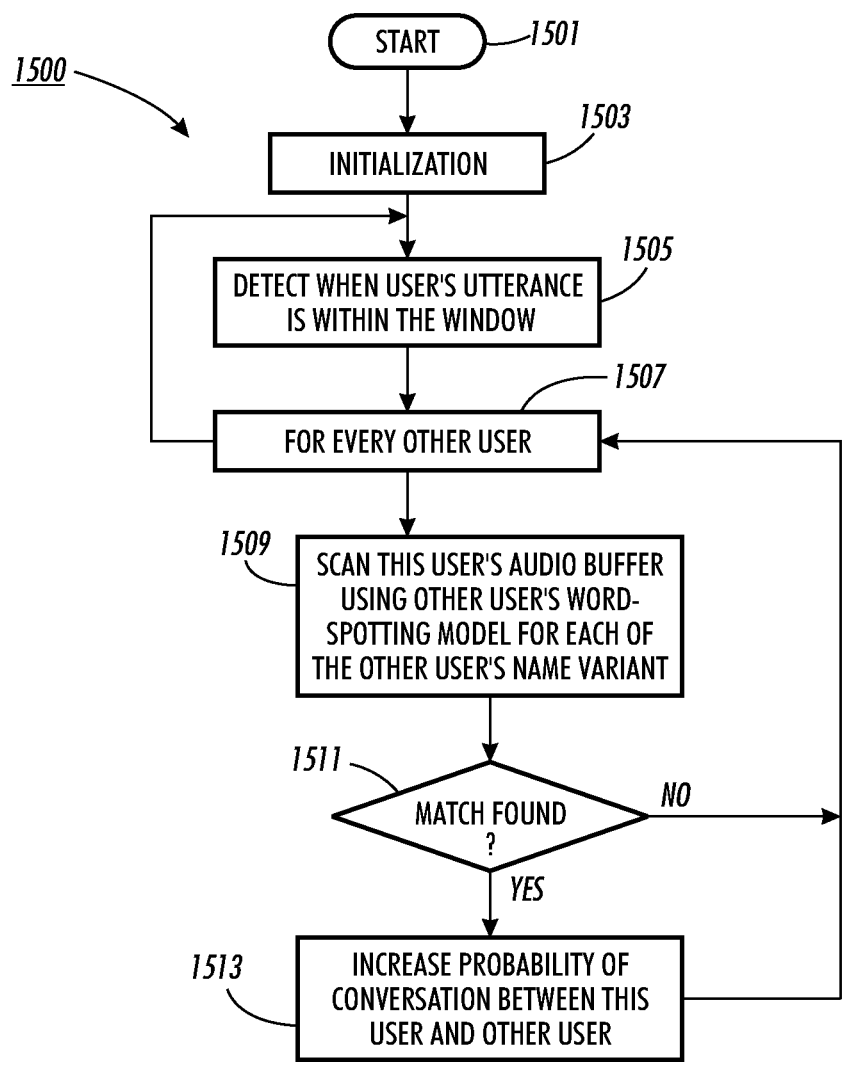
FIG. 15 illustrates one embodiment of a referential-action analysis thread in accordance with a embodiment.

FIG. 15 illustrates a 'referential action analysis' thread 1500 that is invoked by the 'invoke referential analysis thread' procedure 1413, initiates at a 'start' terminal 1501 and that is initialized by an 'initialization' procedure 1503. The 'referential action analysis' thread 1500 then continues to a 'detect user vocalization within window' procedure 1505 that determines whether the user's vocalization is early in the turn (thus, the vocalization occurring where a referential word is more likely to be used). When the user's vocalization is within the window, the 'referential action analysis' thread 1500 continues to an 'iterate every 'other user'' procedure 1507.

For each iterated 'other user', a 'scan for 'other user's' name' procedure 1509 scans 'this user's' audio buffer using the 'other user's' wordspotting model to determine whether 'this user' has vocalized a name variant of the 'other user'. A 'name found' decision procedure 1511 then determines whether one or more matching name variants were found. If no matching name variant was found, the 'referential action analysis' thread 1500 continues back to the 'iterate every 'other user'' procedure 1507 to check another user's name variants.

However, if a name was found at the 'name found' decision procedure 1511, the 'referential action analysis' thread 1500 continues to an 'increase conversation probability' procedure 1513 that increases the probability that 'this user' is in a conversation and increases the probability of a conversation between 'this user' and the 'other user' (by adjusting the probability associated with the corresponding edge between 'this user' and the 'other user' in the participant graph). Then, the 'referential action analysis' thread 1500 continues to the 'iterate every 'other user'' procedure 1507 to continue examining the 'other user' name variants.

At the completion of the 'iterate every 'other user'' procedure 1507, the 'referential action analysis' thread 1500 continues back to the 'detect user vocalization within window' procedure 1505.

To summarize the above, we want to know whether 'this user' has used 'other user's' name at the beginning of 'this user's' vocalization because this is evidence that 'this user' is trying to get 'other user's' attention. The effect is expressed as a higher probability rather than a binary decision because it is possible that 'other user's' name is not actually being used (wordspotting returns a probability of match) or that 'other user's' name is being used in some context other than a "hail". Note that we limit how "far into" the vocalization we look, not so much because wordspotting algorithms are expensive to compute (it can be done in real-time), but rather because the farther the word ('other user's' name) lies in the vocalization, the less likely it is to be used to "hail" the 'other user'.

Furthermore, multiple name variants can be found each with its own probability. The 'increase conversation probability' procedure 1513 can pick the highest probability match, or use some combination of matches to increase the probability of conversation between the users.

Another way to help determine whether two users are in the same conversational floor is to make probabilistic inferences of conversational group membership based on one or more of 'this user's' conversational characteristics that are responsive to acts of 'other users'. In this aspect of the invention, temporal vocalization adjacency is also relevant to the analysis. Potentially relevant user actions include: Backchannel/continuers, Common content, and Prosody.

For backchannel/continuers, if the communication system provides audio content, then users usually produce speech ("uh huh," "hmm," "yeah") that is intended primarily to affirm the current speaker's right to hold their turn and continue speaking. Such backchannel vocalizations, or continuers, can be heuristically distinguished from regular turns by their short length and simple intonation structure. (These measures do not require speech recognition per se. Of course, speech recognition will improve the ability to distinguish backchannel responses by identifying certain vocalizations explicitly. However, heuristic "wordspotting" techniques, trained on corpora of the sounds that are known to make up most backchannel communication, are also effective.) If the communication system uses a non-synchronous medium, such backchannel information will be less frequent but will likely still be present.

For common content, use of similar phrasing from one turn to another provides evidence that the speakers are in conversation. One way to determine this is to compare the temporal energy profiles of vocalizations (as in echo cancellation algorithms). Another way is to break vocalizations into smaller units (such as phonemes) and compare the distributions of various n-grams of these units. Another way is to use speech recognition. For example, speech can be converted to text using known speech recognition techniques. The text can then be compared using textual similarity algorithms drawn from, e.g., the information retrieval art, with high content similarity scores being used to increase the probability that the speakers share a conversational floor. Since turns may constitute multiple statements, it may be useful to compare content similarity (using any of the above approaches, not just speech recognition) at a sub-turn granularity.

Prosody refers to variation in pitch, loudness, tempo, and rhythm. If the communication system provides audio content, then speakers who are sharing a conversational floor tend to produce vocalizations following patterns corresponding to specific prosodic profiles. For example, speakers in a shared conversational floor exhibit similarities in the rhythm of their speech. That is, near-isochronous patterns of stress and emphasis can be identified for each vocalization and the rates of these patterns can be compared across vocalizations.

The existence of strong correlations between adjacent vocalizations by different speakers is evidence of participation in the same conversational floor. The potentially relevant user actions may be concurrent (e.g., audible backchannel to a speaker while listening) or sequential (e.g., use of rhythm or common phrasing in subsequent speech) relative to the others' acts. Features are used to compute conversational floor configurations such as described for the turn taking analysis previously described with respect to FIG. 7 and FIG. 13.

One skilled in the art will understand that the analysis described herein can also be applied to textual communication between more than two people. For example, chat, instant messaging and UNIX talk systems enabled for more than two people. For normal chat and instant messaging systems, where characters are not individually sent to the receiving individuals (in contrast to multiple-party versions of UNIX talk that individually transmit and display each character typed) some of the temporal window-related aspects of the analysis need not be done. However, the referential analysis directly applies as does common content analysis. Furthermore, there are communication characteristics common to those who use chat and instant messaging system. These characteristics can be analyzed accordingly.

Figure 16:
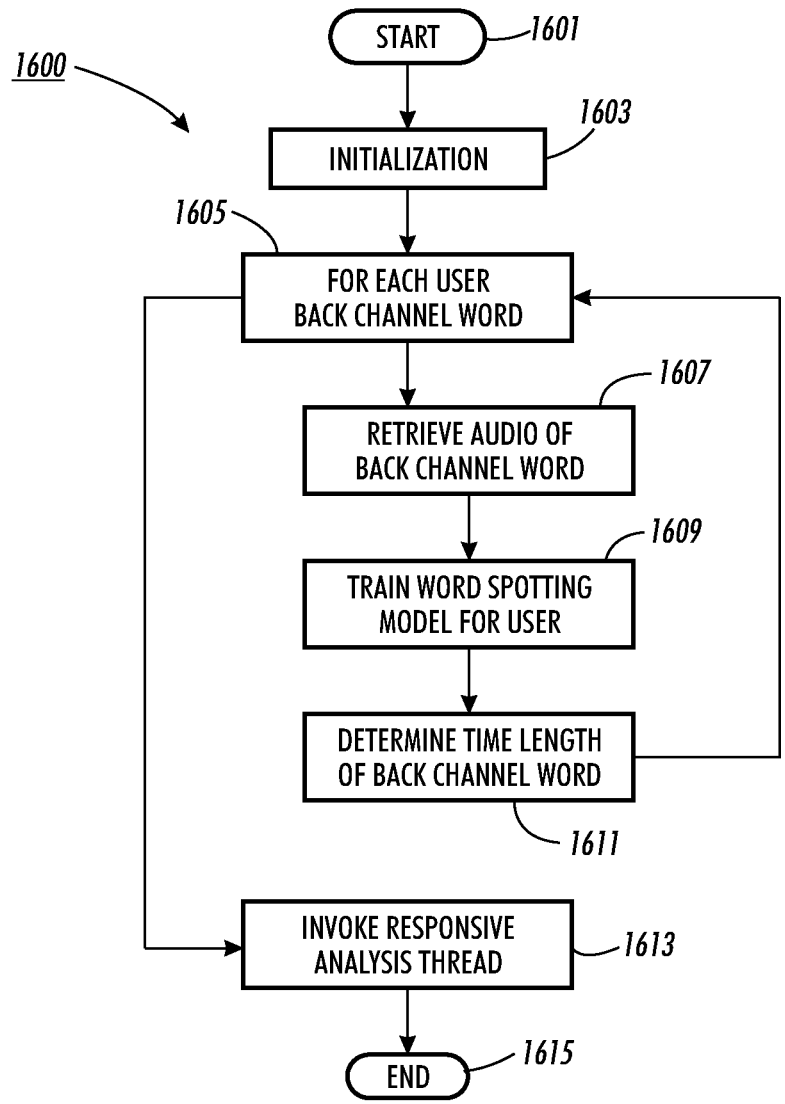
FIG. 16 illustrates one embodiment of a responsive-action analysis initialization process in accordance with a embodiment.

FIG. 16 illustrates a 'responsive action analysis initialization' thread 1600 that is invoked by the 'initialize responsive analysis' procedure 919, initiates at a 'start' terminal 1601, and continues to an 'initialization' procedure 1603 that performs any necessary initialization. The 'responsive action analysis initialization' thread 1600 then continues to an 'iterate each backchannel word' procedure 1605. For each iteration, a 'retrieve backchannel word audio' procedure 1607 retrieves the audio of the backchannel vocalization, and subjects this audio to a 'train wordspotting model for backchannel word' procedure 1609 that trains the user's wordspotting model to recognize the backchannel vocalization. A 'determine time length of backchannel word' procedure 1611 then determines the length of time required to make the vocalization to assist the wordspotting model. After all the backchannel words are processed, the 'responsive action analysis initialization' thread 1600 continues to an 'invoke analysis thread' procedure 1613 that invokes the analysis thread that is subsequently described with respect to FIG. 17. Finally, the 'responsive action analysis initialization' thread 1600 completes through an 'end' terminal 1615. One skilled in the art will understand that some embodiments need not train the wordspotting model as each new input is activated, but can instead (or in conjunction with) use an initially trained wordspotting model.

Figure 17:
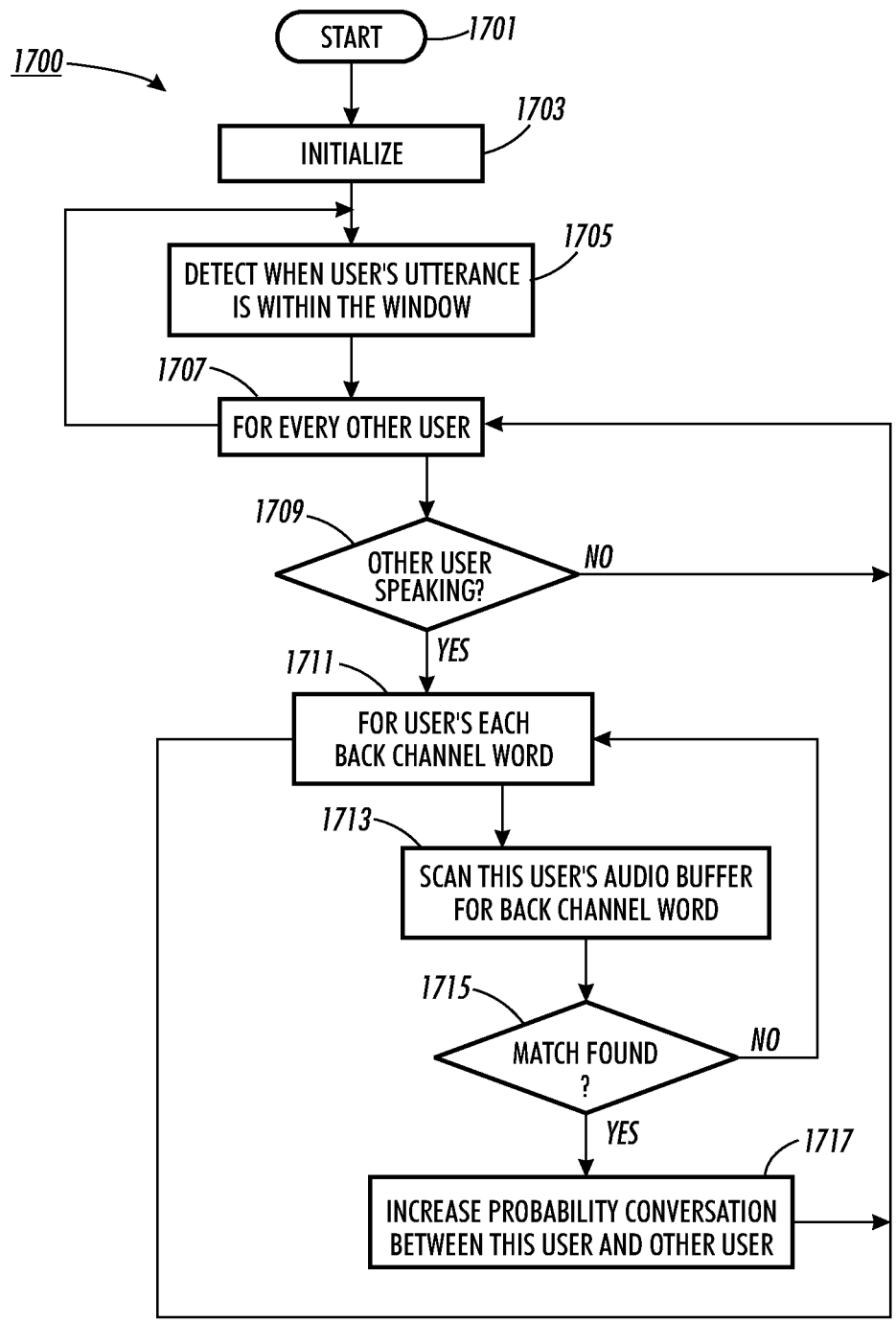
FIG. 17 illustrates one embodiment of a responsive-action analysis thread in accordance with a embodiment.

FIG. 17 illustrates a 'responsive action analysis' thread 1700 that is invoked by the 'invoke analysis thread' procedure 1613, initiates at a 'start' terminal 1701, and initializes at an 'initialization' procedure 1703. A 'detect user vocalization in window' procedure 1705 detects when 'this user' makes a vocalization within a minimum-length window. For this analysis, the window is such that 'this user' has continuously vocalized for a period at least as long as the shortest time length computed by a 'determine time length of backchannel word' procedure 1611. (If the user has not vocalized for at least this much time, none of the wordspotting models can possibly match the current vocalization.) Further, the continuous vocalization should not contain audio samples that have been previously matched by a backchannel wordspotting model. Once 'this user' makes a vocalization within the window, the 'responsive action analysis' thread 1700 continues to an 'iterate every other user' procedure 1707.

For each iterated user, an 'other user speaking' decision procedure 1709 determines whether the iterated user is vocalizing within a vocalization window. A user is vocalizing within the vocalization window when the user is currently speaking (or had been recently speaking, for a definition of "recently" that corresponds to a specified maximum period). If not, the 'responsive action analysis' thread 1700 goes back to the 'iterate every other user' procedure 1707.

Otherwise, the 'responsive action analysis' thread 1700 continues to an 'iterate user's backchannel words' procedure 1711 that iterates each of 'this user's' backchannel words. For each iterated backchannel word, a 'scan 'this user's' audio for backchannel word' procedure 1713 scans 'this user's' audio buffer to determine whether 'this user's' vocalization included the backchannel word. If no match was found for the iterated word, a 'word found' decision procedure 1715 causes the 'responsive action analysis' thread 1700 to go back to the 'iterate user's backchannel words' procedure 1711 to iterate the next backchannel word. However, if a match was found, the 'responsive action analysis' thread 1700 continues to an 'increase conversation probability' procedure 1717 that adjusts the probability in the participant graph that 'this user' and the 'other user' are in conversation. Then the 'responsive action analysis' thread 1700 continues to the 'iterate every other user' procedure 1707 to iterate the next 'other user'. Other embodiments can scan all of the backchannel words and appropriately combine the probabilities of the found words instead of (as is done in this implementation) advancing to the next user after the first backchannel word is found.

Once all the 'other users' have been iterated, the 'responsive action analysis' thread 1700 continues back to the 'detect user vocalization in window' procedure 1705 to detect another vocalization by 'this user' within the minimum-length window.

Figure 18:
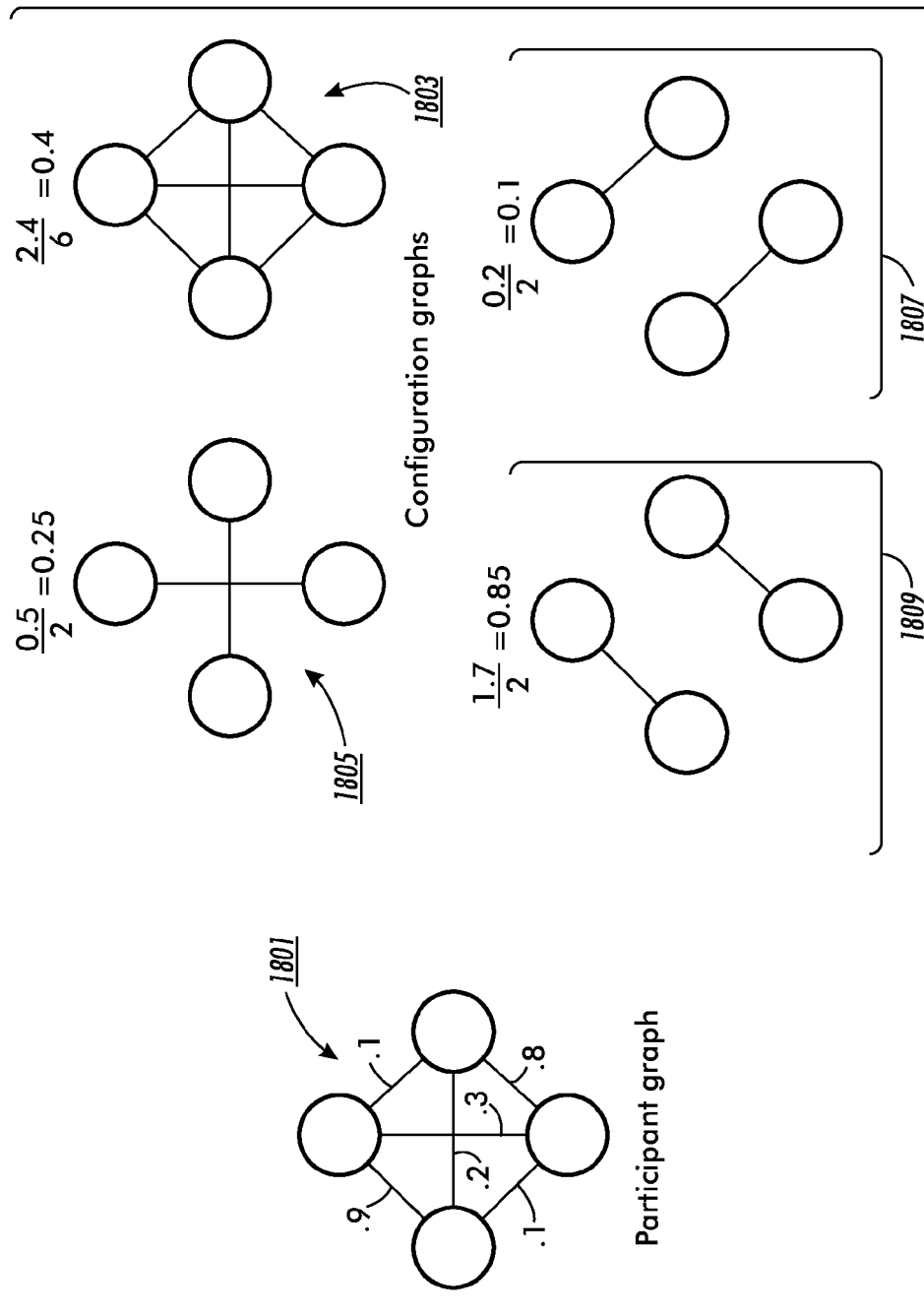
FIG. 18 illustrates example graphs that can be useful in understanding the threads of FIG. 7 and FIG. 12.

FIG. 18 illustrates a set of graphs for illustration 1800. One of the illustrated graphs is a participant graph 1801 that has nodes for the users, and weighted edges for the probability that users represented by the nodes are in conversation. Also shown are a number of configuration graphs that represent possible conversational configurations. These include a four-way configuration graph 1803, a first two-way configuration graph 1805, a second two-way configuration graph 1807, and a third two-way configuration graph 1809.

One way to determine the most likely conversational floor configuration is to find the average of all the weights for each of the configurations. Thus, the four-way configuration graph 1803 has an average weight of 0.4, the first two-way configuration graph 1805 has an average weight of 0.25, the second two-way configuration graph 1807 has an average weight of 0.1, and the third two-way configuration graph 1809 has an average weight of 0.85 making it the most likely conversational floor configuration.

One skilled in the art will understand that the inventive techniques disclosed at least in FIG. 15 and FIG. 17 can be used with other communication besides audio communications. Thus, referential and responsive analysis can also be applied to textual communication (such as chat, instant messaging, or UNIX talk as well as to other types of communication).

One skilled in the art will understand other implementation details that are not germane to any particular embodiment. These details include, but are not limited to, detection of activation and deactivation of a source, any cleanup after a source is deactivated, etc.

In addition, one skilled in the art will understand that there are many ways the invention can be implemented using different architectures as well as different embodiments of any given architecture. The contemplated architecture includes the range from complete hardware implementations through complete software implementations using any programming methodology or combinations of programming methodologies and include the possibility of having the processing capability distributed between the several devices (for example, where the mixing for each output is done on the device that receives the output).

Further, one skilled in the art will understand that the invention can be augmented with additional known types of inferential analysis that use input data other than those directly affected by conversation (i.e., those employed by the present invention). For example, so-called context-awareness systems combine many kinds of physical sensor data and computer application data to make assessments of user activity. A context-aware system that is capable of tracking users' physical locations within a building can compute which users are co-present in a room; such a system might assess co-present users' vocalizations as having a high probability of being directed at each other as opposed to being directed at remote users (who are present in the computer-mediated communication system but not present in the room). These other types of inferential analysis can be integrated with the present invention in a variety of ways. For example, they can be loosely integrated in a way that provides parameters that influence the operation of the 'floor configuration' thread 700 as previously described for manual user inputs. Alternatively, they can be tightly integrated, perhaps being incorporated directly into a state machine that controls the operation of the present invention.

One skilled in the art will also understand that the invention allows multiple users of a shared communication environment to automatically establish conversational floors that allow different groups of users to converse while still having the capability of being aware of other conversations. Automatically here means that there is no explicit command, control action or control word that is used to establish the conversational floor. Instead, conversational characteristics are analyzed and used to establish the conversational floors. The invention can be applied to any shared environment having independently controlled output. Examples of such environments include audio-based Internet chat groups, emergency response communications, telephonic conference connections or other virtual telephonic party lines, teleconferencing systems, etc.

One skilled in the art will understand that known techniques can be used to extend the invention to shared communication environments in which not all users are necessarily in remote locations and associated with a personal input device (such as a microphone) and a personal output device (such as headphones). For example, rather than having users wear individual microphones, the physical environment (such as the rooms within a home or an office building) can be augmented with sensors that track individual users as well as directional beam-forming arrays consisting of multiple microphones. In this case, the vocalizations of each tracked user can be captured as a separate audio stream without using individually worn microphones and the invention operates as described previously. As another example, a single microphone can be used to capture an audio stream corresponding to multiple users. Known speaker-identification techniques can be used to detect conversational characteristics (such as speech activity) of multiple users even when captured as a single audio stream. Thus, substreams can be distinguished from the single audio stream and these substreams can be mixed and analyzed as previously described. Known audio processing algorithms can be used to reduce the salience of particular users' vocalizations (e.g., using subtractive "signal cancellation" techniques) in response to the system's floor controls. In one embodiment, the invention can be used as a form of conversationally-selective hearing aid, being applied using a single open microphone worn by a specific user; in this case, all speech vocalizations except for those corresponding to speakers who are identified as being in conversation with the user wearing the open microphone could be reduced in salience.

From the foregoing, it will be appreciated that the invention has (without limitation) the following advantages:

(a) Provides automatic self-configuration of electronically facilitated group communications.

(b) Relative to computer mediated communication systems with manual floor control: facilitates: remote group communication in which conversational floors (subgroups) can schism and merge (form and coalesce) automatically. This is more lightweight (i.e., requires less effort to use) than manual systems and therefore more appealing to users.

(c) Relative to computer mediated communication systems with manual floor control: facilitates: remote group communication in which conversational floors can schism and merge spontaneously. This is more natural than manual systems, in which user interface gestures (such as mouse-clicks, button-pushes, or voice commands directed at the computer) must be planned and executed prior to a change in floor membership (unlike normal conversation where it happens without prior gestures directed at the computer), and therefore more appealing to users.

(d) Relative to spatial audio systems: enables the user to distinguish audio from a primary audio conversation while retaining the ability to attend to multiple audio conversations, without the need to apply spatial audio effects. This obviates the need of spatial audio systems for delivery of binaural audio, which require (1) normal binaural hearing on the part of the user and (2) the use of stereo speakers or headphones.

(e) Relative to spatial audio systems: enables straightforward audio separation by the user of dynamic groups of multiple speakers. Spatial audio enables separation of single speakers (since each is mapped to a spatial location), but to support dynamic groups of multiple speakers, spatial audio must change the location of some speakers (e.g., by combining the speakers into one spatial location, or moving the spatial location of the speakers to bring them close together). If the multiple speakers are left in their original places as conversational groups change, the user must keep track of the various locations to which they must attend.

(f) Provides a unified conceptual and implementation framework for multi-party conversationally-responsive systems that can be extended to different methods of determining conversational participation, such as audio timing, audio content, text content, and biometric measurements (each of which may be optionally combined with explicit user actions). This allows for sharing of code between system implementations specialized for particular subsets of such methods as well as simplifying the addition of new methods to existing implementations. Previous approaches have been limited to explicit user actions.

(g) Provides a unified conceptual and implementation framework for multi-party conversationally-responsive systems that can be applied to systems using different communication delivery media, such as audio, video and text. This allows for sharing of code between system implementations specialized for particular subsets of such media as well as simplifying the addition of new media for existing implementations. Previous approaches have been limited to products implementing a specific combination of audio and video.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A system for adjusting floor controls based on conversational characteristics, comprising:
input modules to receive audio streams, which each originate from an audio source;
a floor analysis module to maintain floor controls for a current configuration of at least a portion of the audio streams from the audio sources that are participants to an interaction represented by the current configuration, to determine conversational characteristics shared by two or more of the audio sources, to identify different possible configurations of interactions between participants of the audio streams based on the conversational characteristics, to apply a predetermined number of timeslices to each one of the possible configurations, and to automatically adjust the floor controls when the predetermined number of timeslices of one of the possible configurations is satisfied;
an audio mixer module to mix the audio streams into one or more outputs based on the adjusted floor controls; and
a processor to execute the modules.

2. A system according to claim 1, wherein the conversational characteristics are determined by at least one of a turn taking analysis, a referential action analysis, and a responsive action analysis.

3. A system according to claim 2, further comprising:
a turn taking analysis module to perform the turn taking analysis by aligning the audio streams from two or more of the sources, monitoring the aligned audio stream, and identifying the conversational characteristics from the aligned audio stream.

4. A system according to claim 2, further comprising:
a referential action analysis module to perform the referential action analysis by determining that at least one of the audio streams occurs during a time window and identifying at least one conversational characteristic comprising one or more of a name and a name variant for at least one of the other audio sources during the time window.

5. A system according to claim 2, further comprising:
a responsive action analysis module to perform the responsive action analysis by determining that at least one of the audio streams occurs during a time window, by identifying one or more conversational characteristics comprising a backchannel response during the time window, and by matching the back channel response to vocalizations of another audio stream.

6. A system according to claim 1, wherein the conversational characteristics comprise at least one of sustained periods of overlapping speech, a lack of correlation for a beginning of speech, speech beginning at a transition relevance place, communication identifiers, change in speech volume, speech energy amplitude, common content, prosody, and backchannel responses.

7. A system according to claim 1, wherein the predetermined number of timeslices comprises consecutive timeslices.

8. A system according to claim 7, wherein the floor controls are automatically adjusted when the current conversational configuration is maintained for the predetermined number of timeslices and a most probable conversational configuration of the possible configurations is different from the current conversational configuration.

9. A system according to claim 7, wherein the floor controls are automatically adjusted when the current conversational configuration is different from a most probable conversational configuration of the possible conversational configurations for the predetermined number of consecutive timeslices.

10. A system according to claim 7, wherein the floor controls are automatically adjusted when the current conversational configuration is different from a most probable conversational configuration of the possible conversational configurations for more than the predetermined net number of timeslices.

11. A computer-implemented method for adjusting floor controls based on conversational characteristics, comprising:
  receiving audio streams, which each originate from an audio source and maintaining floor controls for a current configuration of at least a portion of the audio streams from the audio sources who are participants to an interaction represented by the current configuration;
  determining conversational characteristics shared by two or more of the audio sources;
  identifying different possible configurations of interactions between participants of the audio streams based on the conversational characteristics;
  applying a predetermined number of timeslices to each one of the possible configurations and automatically adjusting the floor controls when the predetermined number of timeslices of one of the possible configurations is satisfied; and
  mixing the audio streams into one or more outputs based on the adjusted floor controls.

12. A computer-implemented method according to claim 11, wherein the conversational characteristics are determined by at least one of a turn taking analysis, a referential action analysis, and a responsive action analysis.

13. A computer-implemented method according to claim 12, further comprising:
  performing the turn taking analysis, comprising:
    aligning the audio streams from two or more of the sources;
    monitoring the aligned audio streams; and
    identifying the conversational characteristics from the aligned audio stream.

14. A computer-implemented method according to claim 12, further comprising:
  performing the referential action analysis, comprising:
    determining that at least one of the audio streams occurs during a time window; and
    identifying at least one conversational characteristic comprising one or more of a name and a name variant for at least one of the other audio sources during the time window.

15. A computer-implemented method according to claim 12, further comprising:
  performing the responsive action analysis, comprising:
    determining that at least one of the audio streams occurs during a time window;
    identifying one or more conversational characteristics comprising a backchannel response during the time window; and
    matching the back channel response to vocalizations of another audio stream.

16. A computer-implemented method according to claim 11, wherein the conversational characteristics comprise at least one of sustained periods of overlapping speech, a lack of correlation for a beginning of speech, speech beginning at a transition relevance place, communication identifiers, change in speech volume, speech energy amplitude, common content, prosody, and backchannel responses.

17. A computer-implemented method according to claim 11, wherein the predetermined number of timeslices comprises consecutive timeslices.

18. A computer-implemented method according to claim 17, wherein the floor controls are automatically adjusted when the current conversational configuration is maintained for the predetermined number of timeslices and a most probable conversational configuration of the possible configurations is different from the current conversational configuration.

19. A computer-implemented method according to claim 17, wherein the floor controls are automatically adjusted when the current conversational configuration is different from a most probable conversational configuration of the possible conversational configurations for the predetermined number of consecutive timeslices.

20. A computer-implemented method according to claim 17, wherein the floor controls are automatically adjusted when the current conversational configuration is different from a most probable conversational configuration of the possible conversational configurations for more than the predetermined net number of timeslices.

* * * * *